US012101215B2

(12) United States Patent
Shaked et al.

(10) Patent No.: US 12,101,215 B2
(45) Date of Patent: Sep. 24, 2024

(54) POWER AND SPECTRAL EFFICIENCY BASED ON ADDING ODD ORDER MODULATIONS

(71) Applicant: QUALCOMM Incorporated, San Diego, CA (US)

(72) Inventors: Ronen Shaked, Kfar Saba (IL); Yaniv Eistein, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/931,019

(22) Filed: Sep. 9, 2022

(65) Prior Publication Data

US 2024/0089163 A1    Mar. 14, 2024

(51) Int. Cl.
*H04L 27/26* (2006.01)
*H04L 27/34* (2006.01)
*H04W 72/0453* (2023.01)
*H04W 72/23* (2023.01)
*H04L 1/00* (2006.01)

(52) U.S. Cl.
CPC ...... *H04L 27/2628* (2013.01); *H04L 27/3455* (2013.01); *H04W 72/0453* (2013.01); *H04W 72/23* (2023.01); *H04L 1/0003* (2013.01); *H04L 1/0014* (2013.01)

(58) Field of Classification Search
CPC .................................................. H04L 27/2628
USPC ...................................................... 375/262
See application file for complete search history.

(56) References Cited

U.S. PATENT DOCUMENTS

| 2009/0175184 | A1  | 7/2009  | Hyounhee |
|2012/0069793|A1*|3/2012|Chung ................ H04L 27/2613 370/315|
|2014/0177756|A1*|6/2014|Park ........................ H04L 27/10 375/320|
|2016/0337081|A1*|11/2016|Jung ........................ H04L 27/38|
|2019/0356444|A1*|11/2019|Noh ....................... H04L 5/0023|
|2019/0386867|A1*|12/2019|Liu .......................... H04L 27/36|
|2021/0111940|A1*|4/2021|Huang ............... H04B 10/5161|

FOREIGN PATENT DOCUMENTS

EP          3076626 A1    10/2016

OTHER PUBLICATIONS

International Search Report and Written Opinion—PCT/US2023/070669—ISA/EPO—Oct. 25, 2023.

* cited by examiner

*Primary Examiner* — Lihong Yu
(74) *Attorney, Agent, or Firm* — Arent Fox, LLP / Qualcomm

(57) ABSTRACT

Aspects are provided which allow for a network entity such as a base station to configure odd modulation orders to be applied to downlink or uplink transmissions via signaling between the network entity and the UE. Initially, the network entity transmits a configuration to the UE indicating network support for communications using odd order modulation. Afterwards, the UE transmits, and the network entity receives, data in a signal using the odd order modulation. As a result, improved SPEF, PAPR reduction, and phase noise mitigation associated with odd order modulations may be realized through application of odd order modulations to data transmissions or receptions based on network support being configured for such odd order modulations.

28 Claims, 17 Drawing Sheets

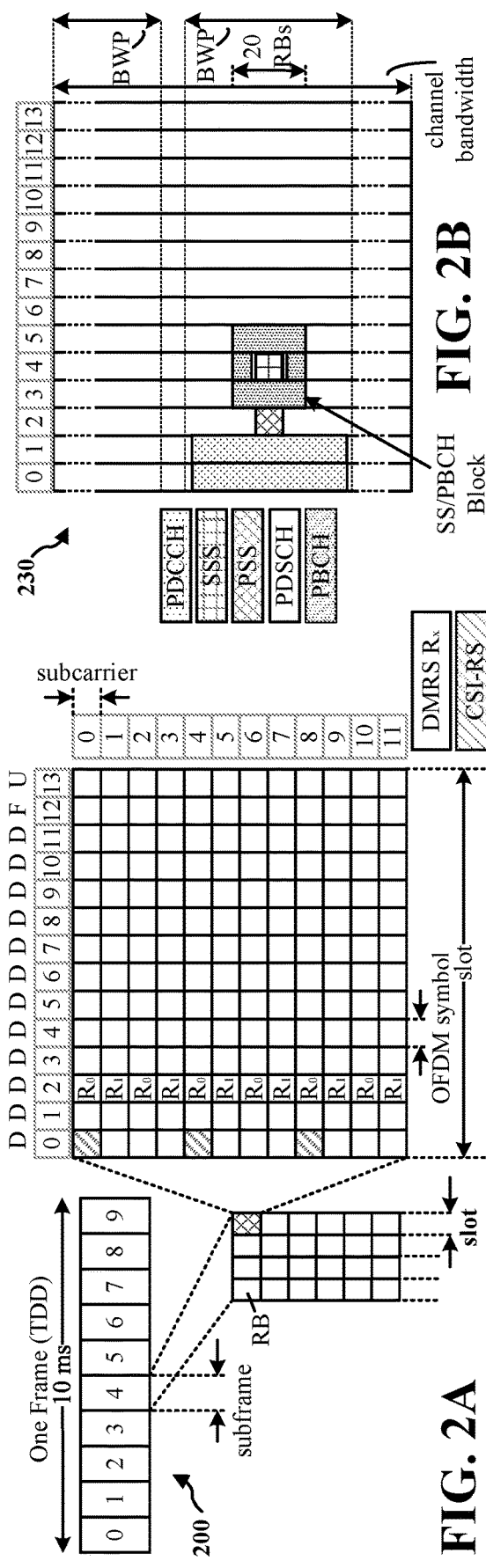
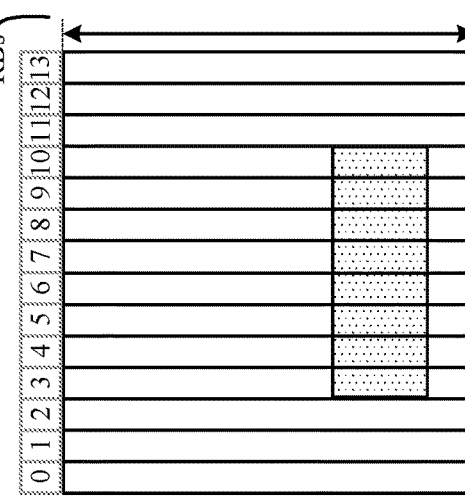
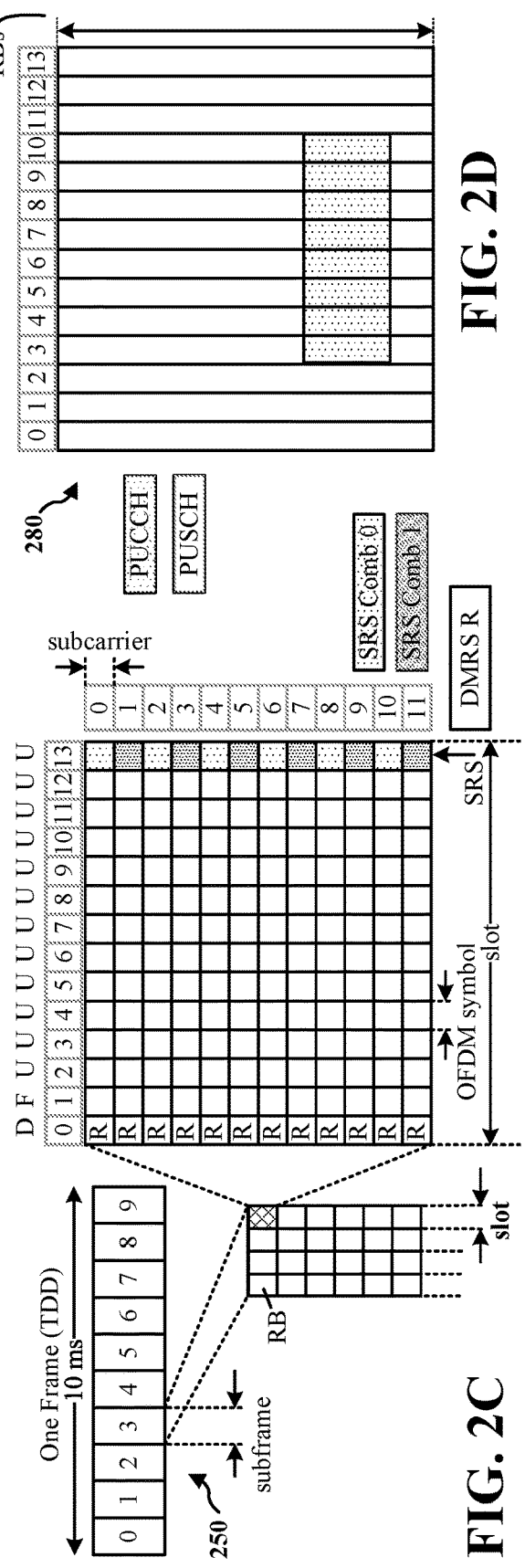
FIG. 2A  FIG. 2B  FIG. 2C  FIG. 2D

POWER AND SPECTRAL EFFICIENCY BASED ON ADDING ODD ORDER MODULATIONS

BACKGROUND

Technical Field

The present disclosure generally relates to communication systems, and more particularly, to a wireless communication system between a user equipment (UE) and a network entity or device such as a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives a configuration indicating network support for communications using odd order modulation, and the UE transmits data in a signal using the odd order modulation.

In an aspect of the disclosure, a method, a computer-readable medium, and an apparatus are provided. The apparatus may be a network entity. The network entity transmits a configuration indicating network support for communications using odd order modulation, and the network entity receives data in a signal using the odd order modulation.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1A:
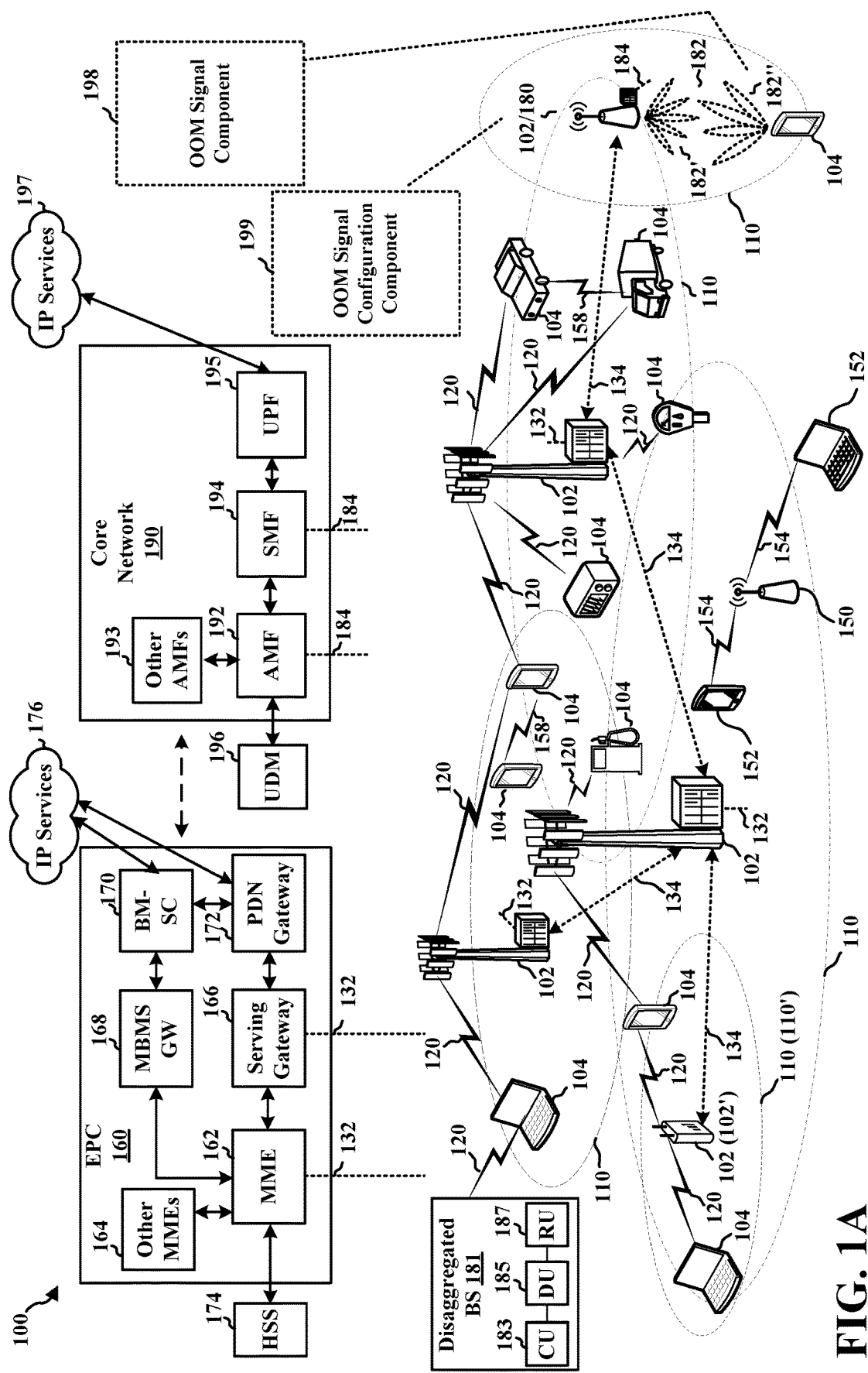
FIG. 1A is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Generally, a network device such as a base station modulates data intended for transmission to a UE using a modulation and coding scheme (MCS) associated with an even modulation order. For instance, the network device may apply quadrature phase shift keying (QPSK) (modulation order=2) or square quadrature amplitude modulation (square QAM), such as 16QAM (modulation order=4), 64QAM (modulation order=6), or 256QAM (modulation order=8), when modulating downlink data to be sent to the UE. Currently, the network device is limited to applying even modulation orders, and not odd modulation orders (e.g., modulation orders 3, 5, 7, 9, etc., such as non-square QAM or amplitude and phase-shift keying (APSK)), due to the relative simplicity in demodulation of signals including even modulation orders compared to signals including odd modulation orders. However, approaches have been developed to reduce the complexity in demodulation of odd order modulated signals. For example, to achieve simplified soft demapping for non-square QAM, the geometric tendency of a non-square QAM constellation and a fold-and-overlap approach may be used to allow for a non-linear log likelihood ratio (LLR) equation based on a max-log maximum a posteriori (MAP) algorithm to be approximated to linear equations, thereby reducing computational complexity significantly.

Nevertheless, while a UE may have the capability of demodulating odd order modulated signals as a result of these approaches to reduce complexity, such capability may be unused without some coordination with the network device (e.g., the base station) to apply odd order modulation. As odd order modulation may provide increased spectral efficiency granularity, improved peak to average power ratios (PAPRs), and improved phase noise mitigation compared to even order modulation, it would be helpful if more MCSs were configurable that allow application of odd order modulation to downlink or uplink signaling.

Accordingly, aspects of the present disclosure allow for the network device to configure odd modulation orders to be applied to downlink or uplink transmissions via signaling between the network device and the UE. For example, the network device may transmit configuration information to the UE indicating support for odd order modulation. The network device and UE may then communicate using the odd order modulation. In this way, odd order modulation may be facilitated between the UE and the network device allowing for increased spectral efficiency granularity, improved PAPRs, and/or improved phase noise mitigation compared to even order modulation. In one example, if the UE is currently communicating with the network device using even order modulation in one MCS table, but the UE is capable of demodulating odd order modulated signals, the UE may request the network device to switch from that MCS table to a different MCS table (an extended MCS table) including MCSs associated with odd order modulation as well as even order modulation. Thus, UEs that are capable of receiving odd order modulated signals may benefit from the associated SPEF improvement with odd modulation orders. In another example, if the UE is also capable of correcting phase noise, the UE may send such request to the network device to apply the extended MCS table to similarly benefit from improved phase noise resiliency. In a further example, if the UE is located at a cell edge but includes this capability of demodulating odd order modulated signals, the UE may request the network device to switch to the extended MCS table to result in lower PAPR. This lower PAPR in turn may allow the UE's transmission power to increase by 0.8 dB, providing significant improvement to signal quality at the cell edge.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1A is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G NR systems, may be arranged in multiple manners with various components or constituent parts. In a 5G NR system, or network, a network node, a network entity, a network device, a mobility element of a network, a RAN node, a core network node, a network element, or a network equipment, such as a BS, or one or more units (or one or more components) performing base station functionality, may be implemented in an aggregated or disaggregated architecture. For example, a BS (such as a Node B (NB), eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station 181 may be configured to utilize a protocol stack that is physically or logically distributed among two or more units (such as one or more central units (CU), one or more distributed units (DUs), or one or more radio units (RUs)). In some aspects, a CU 183 may be implemented within a RAN node, and one or more DUs 185 may be co-located with the CU, or alternatively, may be geographically or virtually distributed throughout one or multiple other RAN nodes. The DUs may be implemented to communicate with one or more RUs 187. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 1B:
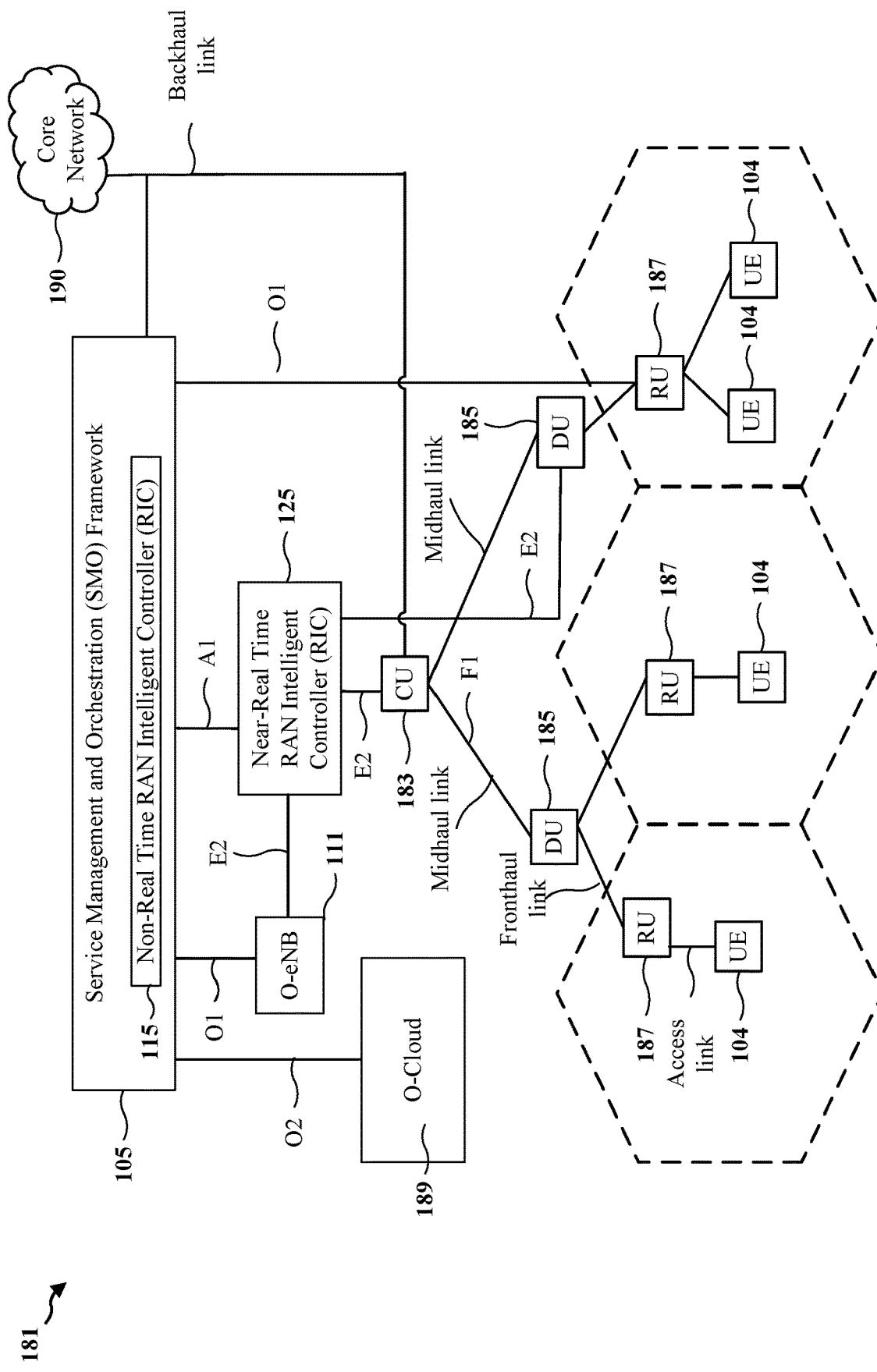
FIG. 1B is a conceptual diagram of an example Open Radio Access Network architecture.

Referring again to FIG. 1A, in certain aspects, the UE 104 may include an odd order modulation (OOM) signal component 198 that is configured to receive a configuration indicating network support for communications using odd order modulation, and transmit data in a signal using the odd order modulation. In certain aspects, the base station 102/180 (or other network device with base station functionality) may include an OOM signal configuration component 199 that is configured to transmit a configuration indicating network support for communications using odd order modulation, and receive data in a signal using the odd order modulation FIG. 1B shows a diagram illustrating an example disaggregated base station 181 architecture. The disaggregated base station 181 architecture may include one or more CUs 183 that can communicate directly with core network 190 via a backhaul link, or indirectly with the core network 190 through one or more disaggregated base station units (such as a Near-Real Time RIC 125 via an E2 link, or a Non-Real Time RIC 115 associated with a Service Management and Orchestration (SMO) Framework 105, or both). A CU 183 may communicate with one or more DUs 185 via respective midhaul links, such as an F1 interface. The DUs 185 may communicate with one or more RUs 187 via respective fronthaul links. The RUs 187 may communicate respectively with UEs 104 via one or more radio frequency (RF) access links. In some implementations, the UE 104 may be simultaneously served by multiple RUs 187.

Each of the units, i.e., the CUs 183, the DUs 185, the RUs 187, as well as the Near-RT RICs 125, the Non-RT RICs 115 and the SMO Framework 105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 183 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 183. The CU 183 may be configured to handle user plane functionality (i.e., Central Unit-User Plane (CU-UP)), control plane functionality (i.e., Central Unit-Control Plane (CU-CP)), or a combination thereof. In some implementations, the CU 183 can be logically split into one or more CU-UP units and one or more CU-CP units. The CU-UP unit can communicate bidirectionally with the CU-CP unit via an interface, such as the E1 interface when implemented in an O-RAN configuration. The CU 183 can be implemented to communicate with the DU 185, as necessary, for network control and signaling.

The DU 185 may correspond to a logical unit that includes one or more base station functions to control the operation of one or more RUs 187. In some aspects, the DU 185 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 185 may further host one or more low PHY layers. Each layer (or module) can be implemented with an interface configured to communicate signals with other layers (and modules) hosted by the DU 185, or with the control functions hosted by the CU 183.

Lower-layer functionality can be implemented by one or more RUs 187. In some deployments, an RU 187, controlled by a DU 185, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 187 can be implemented to handle over the air (OTA) communication with one or more UEs 104. In some implementations, real-time and non-real-time aspects of control and user plane communication with the RU(s) 187 can be controlled by the corresponding DU 185. In some scenarios, this configuration can enable the DU(s) 185 and the CU 183 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements, which may be managed via an operations and maintenance interface (such as an O1 interface). For virtualized network elements, the SMO Framework 105 may be configured to interact with a cloud computing platform (such as an open cloud (O-Cloud) 189) to perform network element life cycle management (such as to instantiate virtualized network elements) via a cloud computing platform interface (such as an O2 interface). Such virtualized network elements can include, but are not limited to, CUs 183, DUs 185, RUs 187 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 187 via an O1 interface. The SMO Framework 105 also may include the Non-RT RIC 115 configured to support functionality of the SMO Framework 105.

The Non-RT RIC 115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 183, one or more DUs 185, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD. Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
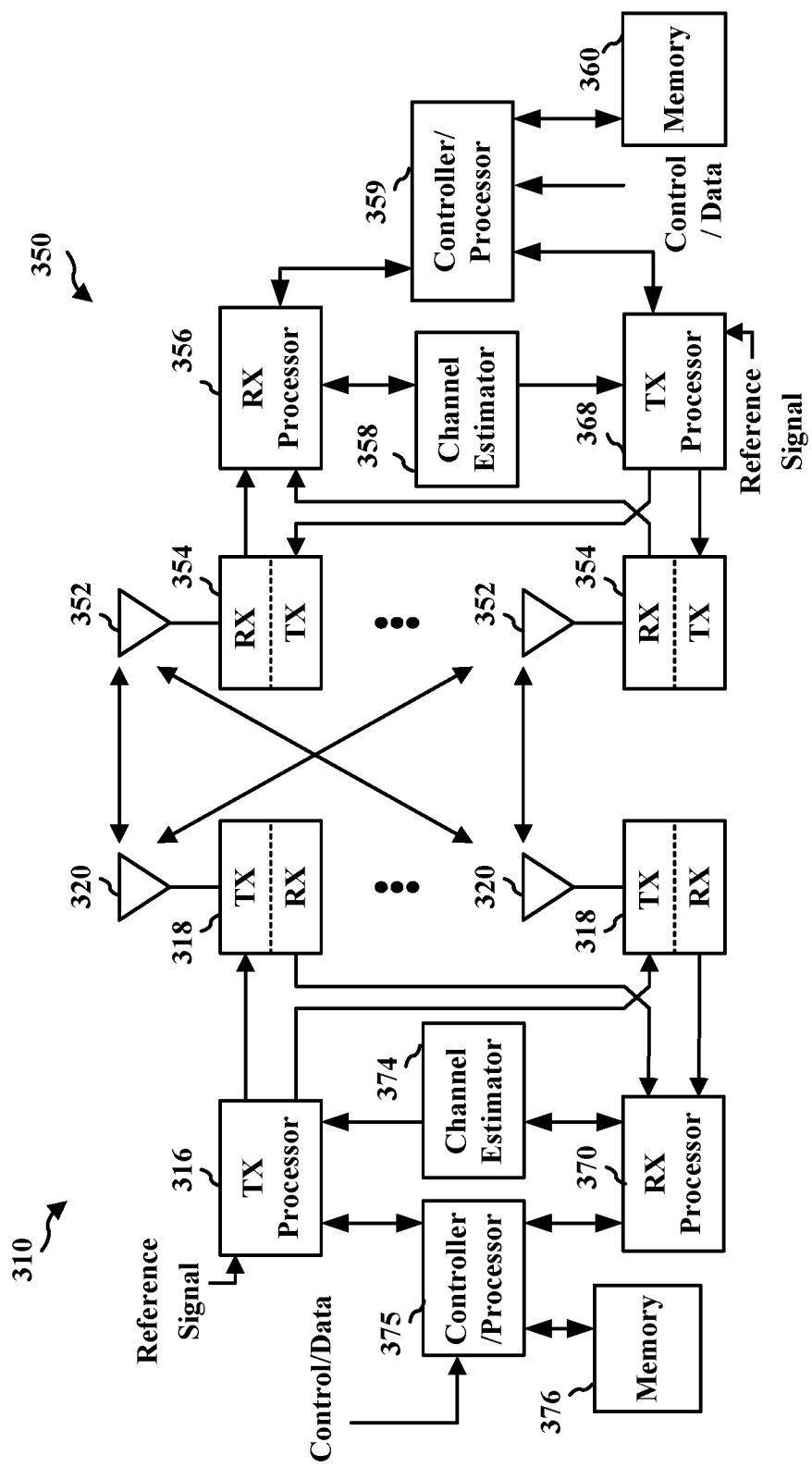
FIG. 3 is a diagram illustrating an example of a network device such as a base station and user equipment (UE) in an access network.

FIG. 3 is a block diagram of a network device 310 such as a base station in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the network device 310. These soft decisions may be based on channel estimates computed by the channel estimator 358. The soft decisions are then decoded and deinterleaved to recover the data and control signals that were originally transmitted by the network device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the network device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the network device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the network device 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with OOM signal component 198 of FIG. 1A.

At least one of the TX processor 316, the RX processor 370, and the controller/processor 375 may be configured to perform aspects in connection with OOM signal configuration component 199 of FIG. 1A.

Generally, a network device such as a base station modulates data intended for transmission to a UE using a MCS associated with an even modulation order. For instance, the network device may apply QPSK (modulation order=2) or square QAM, such as 16QAM (modulation order=4), 64QAM (modulation order=6), or 256QAM (modulation order=8), when modulating downlink data to be sent to the UE. Currently, the network device is limited to applying even modulation orders, and not odd modulation orders, due to the relative simplicity in demodulation of signals including even modulation orders compared to signals including odd modulation orders (e.g., non-square QAM or APSK). However, various approaches have been developed to reduce the complexity in demodulation of odd order modulated signals. Furthermore, while a UE may have the capability of demodulating odd order modulated signals as a result of these approaches to reduce complexity, such capability may be unused without some coordination with the network device to apply odd order modulation. Since odd order modulation may provide increased spectral efficiency granularity, improved PAPR, and improved phase noise mitigation compared to even order modulation, it would be helpful if more MCSs were configurable that allow application of odd order modulation to downlink or uplink signaling.

Typically, a demodulator of a UE (e.g., RX processor 356 or a component of RX processor 356 of UE 350) includes a hard slicer component and a soft slicer component. The hard slicer component makes a hard decision about the bit value of a modulation symbol or constellation point in a constellation diagram, while the soft slicer component makes a soft decision about the reliability of a certain bit value being associated with a modulation symbol or constellation point in the constellation diagram. For even order modulations (square QAM), these hard or soft decisions may be performed in a relatively simple manner, since the constellation diagram associated with even order modulations forms a square shape. For example, due to this square shape, the hard slicer may slice the constellation diagram in a single dimension (along the in-phase "I" signal axis or along the quadrature "Q" signal axis), or determine the distance from the point of origin to the constellation point based solely on the I value or the Q value of the modulation symbol (but not both values), when making a hard decision regarding the associated bit value. Similarly, the soft slicer may determine a log likelihood ratio (LLR) associated with the bit value based solely on the I value or the Q value of the modulation symbol (but not both values), when making a soft decision regarding the associated bit value.

However, for odd order modulations such as non-square QAM, these decisions are more complex to achieve since the constellation diagrams form a non-square shape (e.g., a cross shape). For example, in a non-square QAM constellation diagram, although the hard slicer may similarly make decisions on bit values solely based on the I value or Q value of constellation points which are closer in distance to the point of origin as in square QAM (e.g., the inner area of the cross shape), the hard slicer is typically required to make more complex decisions on bit values based on both the I value and the Q value of constellation points which are farther in distance from the point of origin (e.g., the edges of the cross shape). Similarly, the soft slicer is typically required to determine LLR values associated with bit values based on both the I value and the Q value of the modulation symbols, which may require significantly large look up tables with different mappings between I and Q for respective bit values.

Figure 4B:
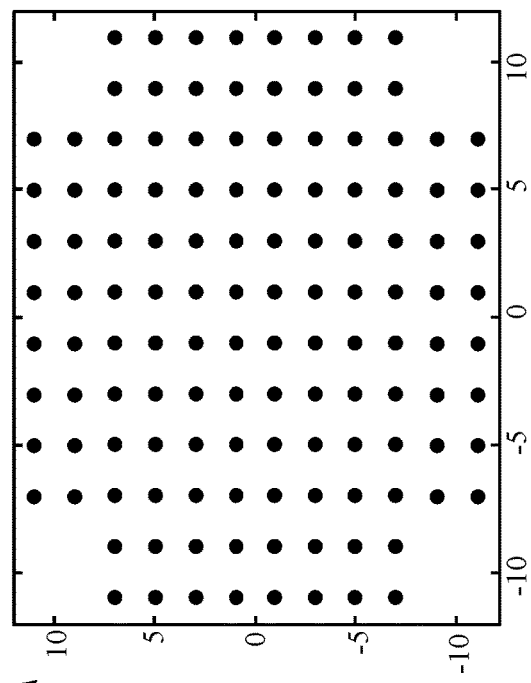
FIGS. 4A-4C illustrate examples of non-square quadrature amplitude modulation (QAM) constellation diagrams.
Figure 4C:
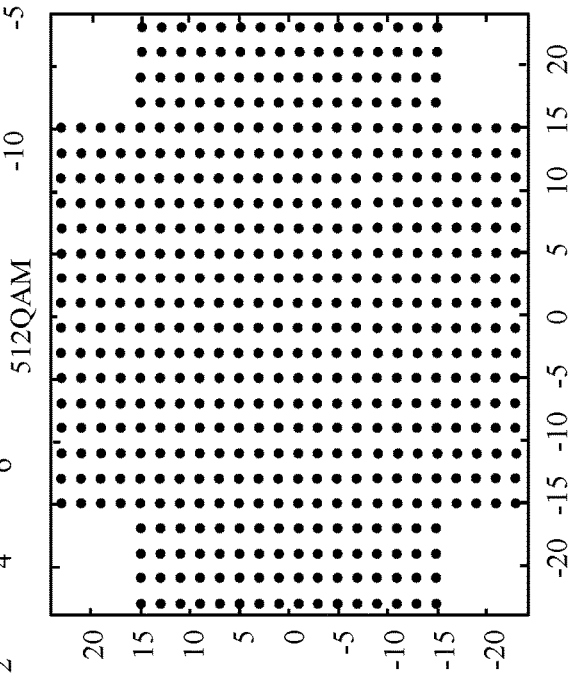
Figure 4A:
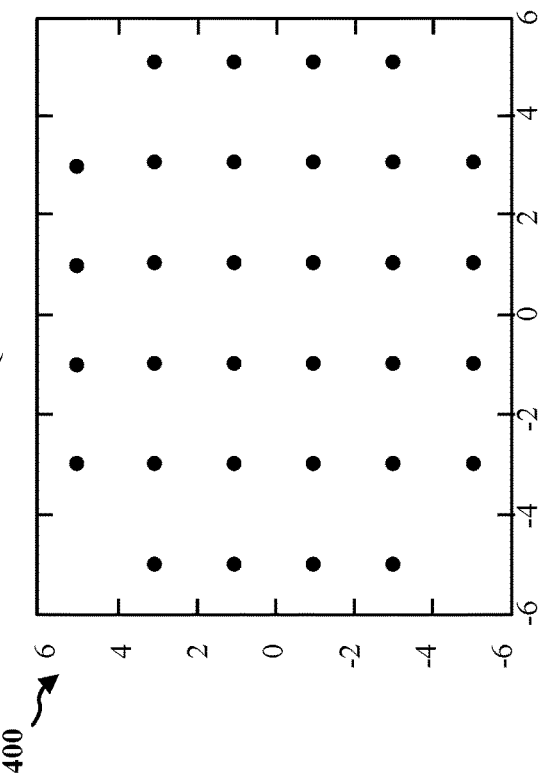

FIGS. 4A-4C illustrate examples 400, 420, 440 of non-square QAM constellation diagrams for 32QAM, 128QAM, and 512QAM respectively. As can be seen in these Figures, such constellation diagrams may include a cross-shape of constellation points or modulation symbols corresponding to possible bit values. Thus, since the corners of the constellation diagrams lack these constellation points, hard and soft decisions with respect to a certain bit value in non-square QAM may be more complex than in square QAM. For example, while a bit value in the inner areas of FIGS. 4A-4C (the central square areas) may be determined based solely on the I value or Q value of its respective constellation point, a bit value in the outer areas of these constellation diagrams (the peripheral rectangular areas) may be a function of both the I value and the Q value of its respective constellation point.

Nevertheless, developments have been made to facilitate demodulation of odd order modulated signals. For example, to achieve simplified soft demapping for non-square QAM, the geometric tendency of a non-square QAM constellation and a fold-and-overlap approach may be used to allow for a non-linear LLR equation based on a max-log MAP algorithm to be approximated to linear equations, thereby reducing computational complexity significantly. This approach, as well as other approaches to reduce demodulation complexity of odd order modulation symbols, allows for the improved SPEF, PAPR reduction, and phase noise mitigation associated with odd modulation orders to be more efficiently realized.

As previously described, odd order modulation may result in improved SPEF, PAPR, and phase noise mitigation. For example, square QAM typically includes gaps of 6 dBs between adjacent modulation orders (e.g., 16QAM, 64QAM, 256QAM, etc.), while adding odd modulation orders may result in smaller gaps of 3 dBs between adjacent modulation orders (e.g., 16QAM, 32QAM, 64QAM, 128QAM, 256QAM, etc.) leading to improved SPEF. Moreover, for square QAM, UEs and base stations (or other network devices with base station functionality) typically include power amplifiers (PAs) operating with lower Tx power to avoid non-linearities, while for odd order modulation, the PAs may operate with higher Tx power (and thus PA efficiency may be achieved) since non-square QAM or APSK constellation diagrams are closer in shape to a circle than square QAM constellation diagrams, leading to improved PAPR. Furthermore, in square QAM, the constellation points at the corners of the constellation diagram have a maximal radius and therefore are most prone to phase errors (e.g., for a given phase noise variation or phase rotation, the angle or corresponding arc of those symbols may be very large and lead to a high symbol error rate). However, for odd order modulations, these corners are trimmed and the symbols shaped to be more angularly distant (e.g., closer in shape to a circle than in square QAM constellations), thereby resulting in symbols with smaller arcs and providing improved phase noise mitigation (more resiliency to phase noise or removal capability of phase noise).

The improved PAPR and phase noise mitigation associated with odd modulation orders may be most apparent in single-carrier or Discrete Fourier transform (DFT) orthogonal frequency-division multiplexing (OFDM) (DFT-OFDM) waveforms, which are typical candidate waveforms in sub-THz environments. Examples of these waveforms may include single-carrier frequency division multiple access (SC-FDMA) waveforms, Discrete Fourier transform-spread orthogonal frequency-division multiplexing (DFT-s-OFDM) waveforms, or Nyquist pulse shaped single carrier waveforms. Such waveforms have simpler phase noise suppression compared to OFDM in the time domain, since it is less complex to track pilots and phase noise and remove the noise in these waveforms than in OFDM. In OFDM (pure without a DFT spread), intercarrier interference (ICI) may occur between neighbor carriers, making it difficult to fully cancel the ICI or remove the phase noise, while in single carrier or DFT-OFDM waveforms, the phase noise can almost be completely removed. Moreover, better PA efficiency may be achieved from the low PAPR associated with these waveforms, since UEs or base stations (or other network devices) with lower cost PAs may compensate these PAs' nonlinearity with the improved PAPR from odd order modulation.

Thus, odd order modulation may address the challenges present in a sub-THz environment of increasing spectral efficiency, reducing PAPR, and mitigating phase noise at the same time (where phase noise is typically high, and where PA nonlinearity is typically poor or PA cost is high). For example, odd order modulation may provide more resiliency to phase noise, reduce PAPR and thus provide better PA efficiency, and handle bandwidth more efficiently. Thus, it would be helpful for UEs with the capability to demodulate odd order modulated signals to coordinate with the network device (e.g., the base station) to apply this capability in subsequent signaling. Accordingly, aspects of the present disclosure allow for the network device to configure odd modulation orders to be applied to downlink or uplink transmissions via signaling between the network device and the UE.

In one example, if the UE is currently communicating with the network device using even order modulation in one MCS table, but the UE is capable of performing simplified soft demapping for non-square QAM as previously described in connection with LLR calculations (or otherwise is capable of demodulating odd order modulated signals with minimized complexity), the UE may request the network device to switch from that MCS table to a different MCS table (an extended MCS table) including MCSs associated with odd order modulation as well as even order modulation. Thus, UEs that are capable of receiving odd order modulated signals may benefit from the associated SPEF improvement with odd modulation orders. In another example, if the UE is also capable of correcting phase noise (typically in single-carrier or DFT-OFDM waveforms but not limited to these waveforms), the UE may send such request to the network device to apply the extended MCS table to similarly benefit from improved phase noise resiliency. In a further example, if the UE is located at a cell edge but includes this capability of demodulating odd order modulated signals, the UE may request the network device to switch to the extended MCS table to result in lower PAPR. This lower PAPR in turn may allow the UE's transmission power to increase by 0.8 dB, providing significant improvement to signal quality at the cell edge.

Figure 5:
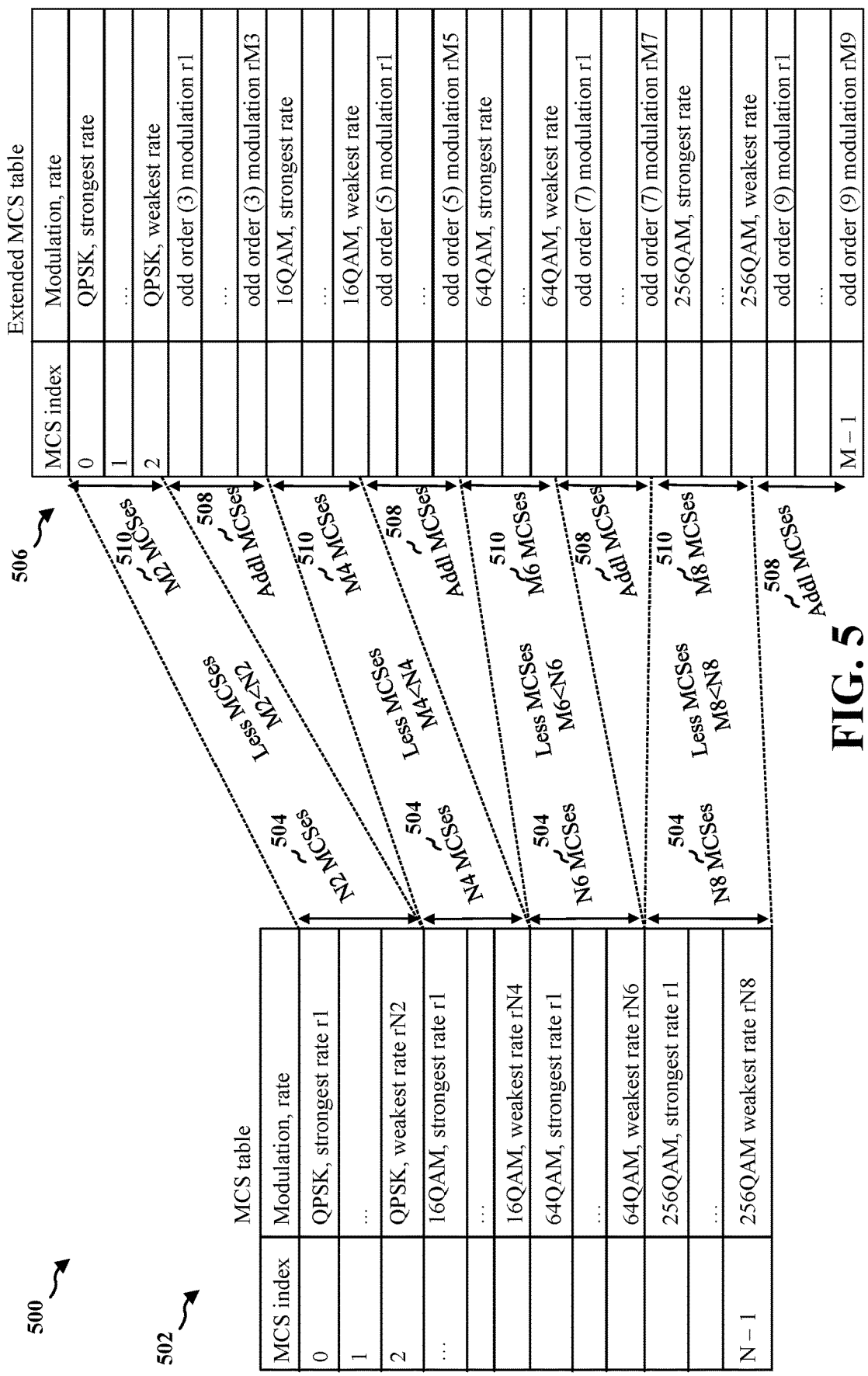
FIG. 5 illustrates an example of a modulation and coding scheme (MCS) table including MCSs with even modulation orders and various code rates, and an extended MCS table including MCSs with odd modulation orders and various code rates.

FIG. 5 illustrates an example 500 of an MCS table 502 including MCSs 504 with even modulation orders (e.g., QPSK, 16QAM, 64QAM, 256QAM) and various code rates (associated with up to N different MCS indices), and an extended MCS table 506 including additional MCSs 508 with odd modulation orders (e.g., 8QAM, 32QAM, 128QAM, 512QAM) and various code rates (associated with up to M different MCS indices). Each MCS 504 or row of the MCS table 502 for a given modulation order may indicate a certain code rate, with lower quantities indicating stronger code rates (e.g., 0.5 code rate for 16QAM results in a SPEF of 2 bps/Hz) and higher quantities indicating weaker code rates (e.g., 0.9 code rate for 16QAM results in a SPEF of 3.6 bps/Hz).

The extended MCS table 506 not only includes additional MCSs 508 with odd modulation orders but also corresponding MCSs 510 with even modulation orders (e.g., QPSK, 16QAM, 64QAM, 256QAM) to MCSs 504 in MCS table 502. Thus, the extended MCS table 506 may effectively be twice the size of MCS table 502. However, as further described below with respect to FIG. 8 below, the odd modulation orders may have better SPEF or throughput over even modulation orders at certain code rates. Therefore, the extended MCS table 506 may be designed to lack certain MCSs (i.e., omit certain rows) associated with even order modulations having code rates that result in less SPEF or throughput compared to adjacent MCSs with odd modulation orders. For example, additional MCSs 508 with 32QAM may result in better throughput than MCSs 504 with 64QAM at certain code rates, and therefore the extended MCS table 506 may omit the 64QAM MCSs with those certain code rates in corresponding MCSs 510. This point is illustrated in FIG. 5 by the quantities N[modulation order] for MCS table 502 and M[modulation order] for extended MCS table 506, where for QPSK or modulation order 2, M2<N2 (i.e., the quantity of corresponding MCSs 510 in extended MCS table 506 for QPSK is less than the quantity of MCSs 504 in MCS table 502 for QPSK), for 16QAM or modulation order 4, M4<N4 (i.e., the quantity of corresponding MCSs 510 in extended MCS table 506 for 16QAM is less than the quantity of MCSs 504 in MCS table 502 for 16QAM), and so forth.

As a result, the extended MCS table 506 may include the best MCSs from MCS table 502, while omitting those MCSs 504 which do not add value over their adjacent odd modulation order counterparts. This selective approach for the extended MCS table 506 may also save communication overhead by minimizing the number of rows, and thus the quantity of bits, the network device (e.g., the base station) may use to indicate a particular MCS index to be applied from the extended MCS table 506. Additionally, since the extended MCS table 506 may provide additional complexity to the UE in selecting which MCS to apply in a CSI report (since the UE has additional odd modulation orders to consider for CQI), the omission of certain MCSs may reduce the quantity of MCSs from which the UE may choose, thereby lightening this complexity.

Figure 6:
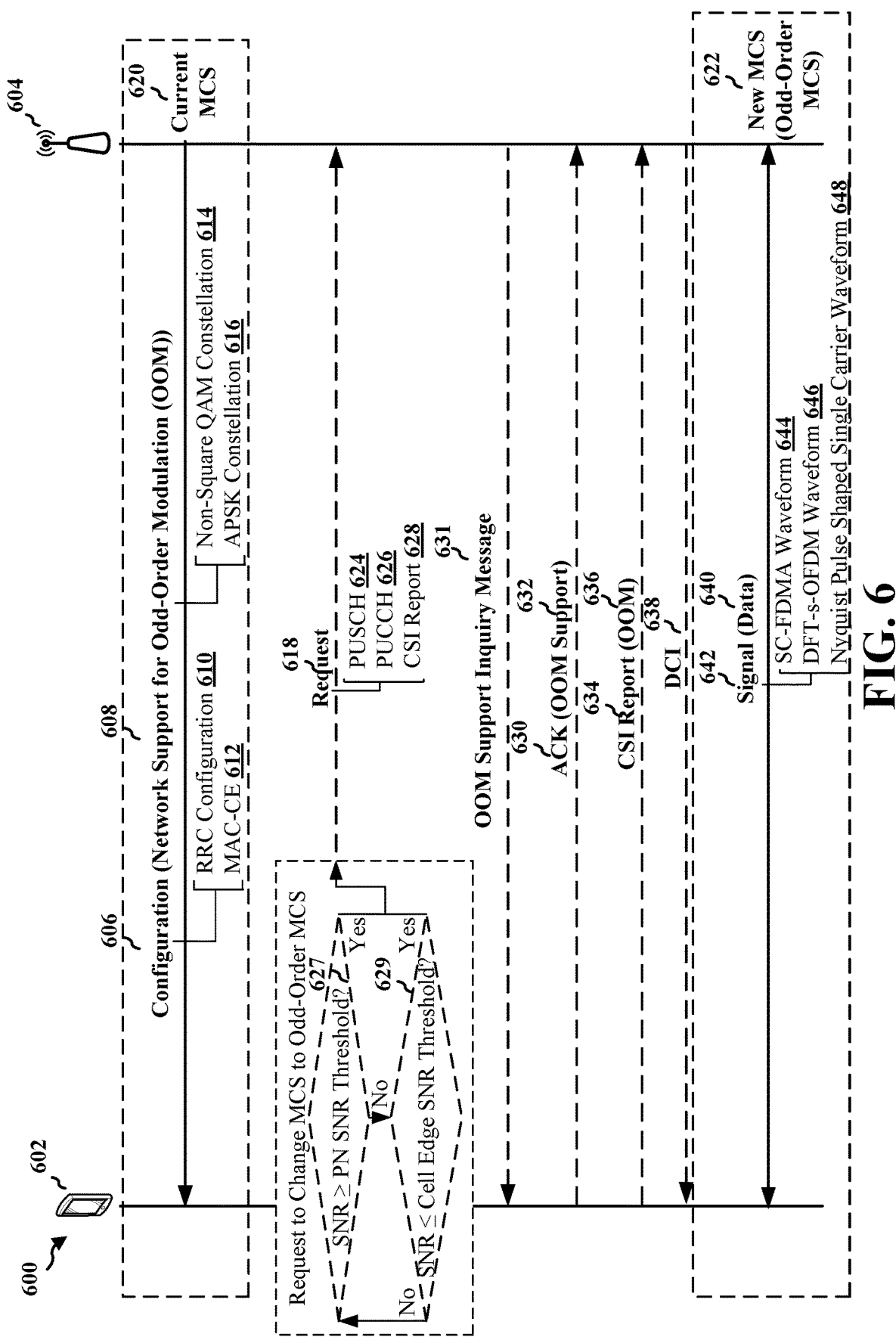
FIG. 6 illustrates an example of a call flow between a UE and a network device such as a base station for odd modulation orders to be applied in downlink or uplink communications.

FIG. 6 illustrates an example 600 of a call flow between a UE 602 and a network device 604 (e.g., base station 102/180 or disaggregated BS 181) for odd modulation orders to be applied in downlink or uplink communications. Initially, the network device 604 may transmit information indicating a configuration 606 to the UE 602 indicating network support 608 for odd-order modulation (OOM). For instance, the configuration 606 may be a RRC configuration 610 or a MAC-CE 612, and the OOM may be associated with a non-square QAM constellation 614 (e.g., as illustrated in FIGS. 4A-4C) or a non-square APSK constellation 616. The UE 602 may receive this information indicating configuration 606, for example, after the UE enters a cell of the network device 604, in which case the UE may determine from the configuration 606 whether the cell supports OOM (e.g., an MCS in extended MCS table 506 of FIG. 5 is supported by the network). If configuration 606 indicates network support 608 for such odd modulation order MCSs, the network device 604 may switch between MCS table 502 and extended MCS table 506 for communications with UE 602. Otherwise, if configuration 606 indicates no network support 608 (e.g., network support 608 does not exist), only even modulation orders such as in MCS table 502 may be applied.

The network support 608 for OOM may be indicated via a flag, bit value, or information element (e.g., with a value '1' indicating network support exists and a value '0' indicating network support does not exist, or vice-versa). The network device 604 may support OOM (and thus network support 608 may be set accordingly), for example, if the network device 604 is capable of applying an MCS associated with an odd modulation order (e.g., non-square QAM or APSK) to its downlink transmissions. For instance, this capability may exist, and thus network support 608 for OOM may be present, if extended MCS table 506 of FIG. 5 has been pre-defined or configured with odd modulation orders that the network device may utilize in its downlink transmissions. In contrast, this capability may not exist, and thus network support 608 for OOM may be lacking, if extended MCS table 506 has not been defined or configured and only MCS table 502 is supported. For uplink transmissions, the network device 604 may similarly indicate network support 608 exists if the aforementioned MCS table has been pre-defined or configured such that the UE may similarly utilize its odd modulation orders for its uplink transmissions. Thus, the network support 608 may be a static indication that is broadcast from the network device 604 to the UE 602.

In one example, if network support 608 exists and the UE 602 is capable of performing simplified soft demapping for non-square QAM as previously described in connection with LLR calculations (or otherwise is capable of demodulating odd order modulated signals with minimized complexity), the UE 602 may transmit a request 618 to the network device 604 requesting to switch from the MCS table 502 to the extended MCS table 506. For instance, the UE 602 may request to switch from a current MCS 620 from MCS table 502 that is applied to communications between the UE 602 and the network device 604 to a new MCS 622 from extended MCS table 506. The current MCS 620 may be, for example, an even modulation order and coding rate from MCS table 502 applied to prior communications such as configuration 606, while the new MCS 622 may be, for example, an odd modulation order and coding rate (or a corresponding even modulation and coding rate) from extended MCS table 506. The UE 602 may provide the request 618 in PUSCH 624 or in PUCCH 626, such as in UCI or a CSI report 628, to achieve improvement in SPEF with the new MCS 622.

In addition to providing request 618 to network device 604 to switch to extended MCS table 506 for sake of SPEF improvement, the UE 602 may send the request 618 for reasons related to phase noise resiliency or PAPR as well. For instance, if the UE is operating in high SNR conditions (e.g., ≥28 dB), the UE may benefit from phase noise resiliency, while if the UE is operating in low SNR conditions (e.g., ≤−5 dB), the UE may benefit from PAPR reduction. In either situation, the UE 602 may request the network device 604 to switch to the extended MCS table 506 and apply an odd modulation order to new MCS 622. Thus, the UE 602 may determine whether to transmit request 618 to the network device 604 based on a currently observed SNR (e.g., an SNR of configuration 606 or other prior communication between UE 602 and network device 604).

With respect to phase noise resiliency, at high SNR conditions, thermal noise becomes less dominant and phase noise becomes a significant factor affecting wireless communications. For instance, generally as a UE increases its Tx power, its throughput also increases. This increase in throughput with Tx power will continue as SNR increases until a certain threshold or phase noise level (e.g., 28 dB in mmW) is reached, at which point the throughput may no longer rise even with an increase in Tx power (since now phase noise may limit the throughput). However, with phase noise correction, the UE may continue to increase its throughput beyond this limit. Thus, at block 627, the UE 602 may check whether its observed SNR is at least equal to a phase noise SNR threshold (e.g., 28 dB), at which point phase noise correction may be required for maximal throughput. In response to this determination, the UE 602 may send the request 618 to switch its current MCS 620 (even modulation order) to new MCS 622 (odd modulation order) from the extended MCS table 506 to better cope with the phase noise at higher SNRs.

With respect to PAPR, if the UE is located at a cell edge, the UE may observe very low or weak SNR (e.g., negative SNR at QPSK with a strong code rate). At such low SNR conditions, the UE may benefit from reduced PAPR due to odd order modulation, since this in turn may allow the UE to boost its Tx power to compensate for the low SNR. Therefore, at block 629, the UE 602 may check whether its observed SNR is at most equal to a cell edge SNR threshold (e.g., −5 dB), at which point a Tx power boost may be helpful. In response to the determination, the UE 602 may send the request 618 to switch its current MCS 620 (even modulation order) to new MCS 622 (odd modulation order) from the extended MCS table 506 to reduce its PAPR and increase its Tx power by almost 1 dB (e.g., as described below with respect to FIG. 9).

In another example where network support 608 is present, alternatively to (or additionally to) the UE 602 sending request 618 to the network device 604 to switch to the extended MCS table 506, the network device 604 may determine to switch to the extended MCS table 506 if the UE 602 indicates it is capable of supporting OOM. For instance, the network device 604 may transmit an OOM support inquiry message 631 to the UE 602 inquiring whether the UE 602 is capable of demodulating odd order modulated signals. In response to the OOM support inquiry message 631, the UE 602 may transmit an acknowledgment 630 indicating whether or not the UE includes OOM support 632. For instance, if the UE 602 is capable of performing simplified soft demapping for non-square QAM as previously described in connection with LLR calculations (or otherwise is capable of demodulating odd order modulated signals with minimized complexity), the UE 602 may indicate in acknowledgment 630 that it includes OOM support 632. Otherwise, the UE may indicate that it does not include OOM support 632. The OOM support 632 may be indicated via a flag, bit value, or information element (e.g., with a value '1' indicating UE support exists and a value '0' indicating UE support does not exist, or vice-versa). In response to receiving the acknowledgment 630, if OOM support 632 is indicated to exist, the network device 604 may determine to switch to the extended MCS table 506 and apply one of its MCSs 510 as the new MCS 622.

In a further example where network support 608 exists, the UE 602 may transmit a CSI report 634 indicating an OOM 636 for the network device 604 to apply. Generally in response to receiving CSI-RS (not shown), the UE may measure the CSI-RS to determine CQI associated with a particular MCS, and report that CQI in the CSI report 634 to the network device 604. If MCS table 502 is currently being applied, the UE may select CQI associated with an even modulation order in the MCS table 502. However, if the network device 604 indicated network support 608 for OOM (e.g., extended MCS table 506 may be applied), the UE may instead select CQI associated with an odd modulation order in the extended MCS table 506. This odd modulation order associated with the CQI may be indicated as OOM 636 in the CSI report 634. Thus, there may be multiple pre-defined CQI tables associated with different MCS (even modulation orders and odd modulation orders), similar to MCS table 502 and extended MCS table 506.

Alternatively or additionally, if the UE supports OOM (e.g., the UE includes OOM support 632) but is currently using an MCS from MCS table 502, the UE may determine itself to choose a new MCS with an odd modulation order from extended MCS table 506, and include the CQI associated with that new MCS in the CSI report 634. Thus, the CSI report 634 may effectively serve as a request (similar to request 618) to the network device 604 to switch current MCS 620 (an even modulation order) to the new MCS 622 (an odd modulation order indicated via OOM 636). The UE 602 may send such request in its CSI report 634 if it determines that an odd modulation order MCS is better than an even modulation order MCS at a currently observed SNR. However, even if the UE includes OOM support 632, if the UE determines that an even order modulation MCS in MCS table 502 happens to be better than an odd modulation order MCS in extended MCS table 506 at a currently observed SNR, the UE may nevertheless select CQI associated with even order modulation from the MCS table 502.

In response to receiving the request 618, the ACK 630 indicating OOM support 632, or the CSI report 634 including the CQI indicating the OOM 636, the network device 604 may transmit DCI 638 to the UE 602 scheduling a downlink or uplink transmission of data 640 using an odd order modulation MCS from the extended MCS table 506. Subsequently, the UE 602 may receive or transmit a signal 642 including the data 640 using the new MCS 622 (the odd order modulation). The signal may be carried in a SC-FDMA waveform 644, a DFT-s-OFDM waveform 646, a Nyquist pulse shaped single carrier waveform 648, or other waveform allowing for simpler phase noise suppression and lower PAPR. Thus, the UE 602 may achieve improved SPEF, PAPR reduction, and phase noise resiliency over its prior MCS (the even order modulation).

Figure 7:
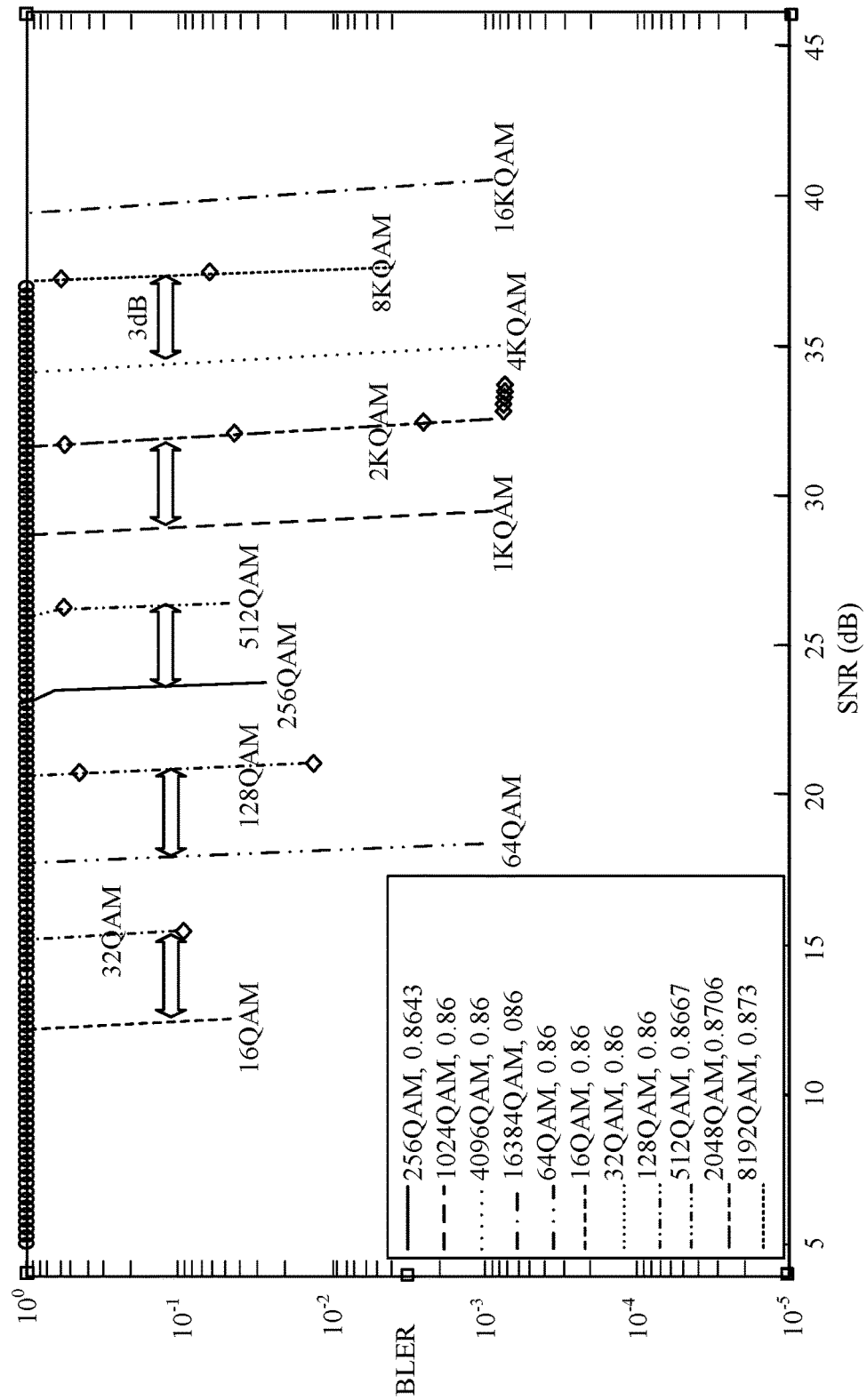
FIG. 7 illustrates an example of a chart showing spectral efficiency (SPEF) improvement as a result of odd modulation orders based on a relationship between signal to noise ratio (SNR) and block error rate (BLER).

FIG. 7 illustrates an example 700 of a chart showing SPEF improvement as a result of odd modulation orders based on a relationship between SNR and block error rate (BLER). As can be seen in the illustrated chart and assuming a fixed code rate (e.g., 0.86 or 0.87), increasing the modulation order from one even modulation order to another even modulation order (e.g., 16QAM to 64QAM) requires a 6 dB increase in SNR to handle the additional two bits the increased modulation order provides. However, increasing the modulation order from an even modulation order to an odd modulation order (e.g., 16QAM to 32QAM) or vice-versa (e.g., 32QAM to 64QAM) requires only 3 dB increase in SNR to handle the additional bit the increased modulation order provides. Thus, by configuring odd modulation orders for use in wireless communication, SPEF granularity may be increased via finer shifts in modulation order (e.g., even to odd and odd to even). With such smaller SPEF granularities, improvement to throughput may result.

Figure 8:
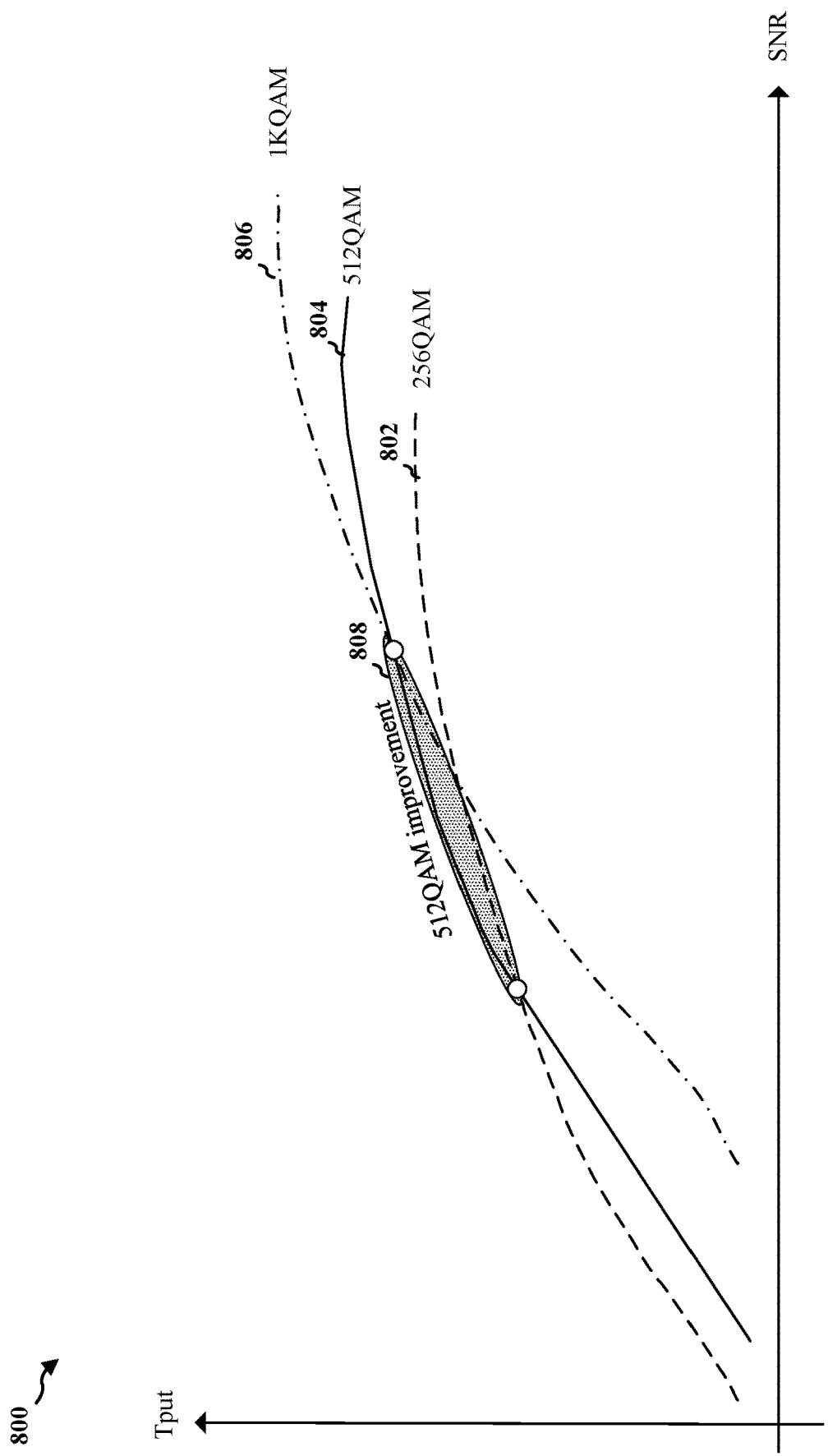
FIG. 8 illustrates an example of a chart showing SPEF improvement from odd modulation orders based on a relationship between SNR and throughput.

FIG. 8 illustrates an example 800 of a chart showing SPEF improvement from odd modulation orders based on a relationship between SNR and throughput (Tput). In this example, the curves shown respectively refer to an even modulation order 256QAM (low curve 802), an odd modulation order 512QAM (middle curve 804), and an even modulation order 1024QAM (high curve 806), although other adjacent modulation orders may be used in other examples. As can be seen in the Figure, middle curve 804 shows lower throughput than high curve 806 at higher SNRs yet higher throughput at lower SNRs, while middle curve 804 shows higher throughput than low curve 802 at higher SNRs yet lower throughput at lower SNRs. As a result, a region 808 between the intersection of low curve 802 and middle curve 804 and the intersection of middle curve 804 and high curve 806 may be formed. This region 808 represents the SNR range in which the odd modulation order results in better SPEF than the adjacent even modulation orders, since in this region middle curve 804 includes the highest throughput at the lowest SNR between the three curves. Moreover, this maximum throughput, minimal SNR region is not limited to the set of modulation orders 256QAM, 512QAM, and 1024QAM; rather, similar regions may exist for any odd modulation order between any two adjacent even modulation orders. For any of these regions (e.g., region 808), the extended MCS table 506 of FIG. 5 may omit even modulation orders with code rates that fit within these regions, since the odd modulation order would be superior to adjacent even modulation orders of certain code rates in the associated SNR range.

Regarding why middle curve 804 shows lower throughput (bits per symbol) than high curve 806 at higher SNRs, the odd modulation order is associated with one less bit than the upper even modulation order (e.g., 512QAM vs.

1024QAM), resulting in the odd modulation order having a weaker code rate with smaller overhead than the upper even modulation order. For example, if 1024QAM is associated with a 0.8 code rate, the quantity of coded bits would be 8 (e.g., 10 bits*0.8 code rate=8 bits per symbol), and therefore to match this quantity 512QAM would have to be associated with a 0.88 code rate (e.g., 9 bits*0.88 code rate≈8 bits per symbol). Thus, at the same level of throughput, the odd modulation order would require a higher code rate than the upper even modulation order, resulting in the odd modulation order requiring higher SNR than the upper even modulation order to maintain the same throughput. Thus, a weakening in code rate (even as low as 1%) may result in significant loss at the decoder of the UE or network device (e.g., the base station) and thus require operation at higher SNRs, which is why middle curve 804 is shown below high curve 806 at higher SNRs. Moreover, lower curve 802 shows lower throughput than middle curve 804 at higher SNRs for similar reasons.

Regarding why middle curve 804 shows higher throughput than high curve 806 at lower SNRs, the receiver of the UE or network device (e.g., the base station) not only includes a decoder but also a demodulator. While the decoder may benefit from the upper even order modulation (e.g., 1024QAM) with a strong code rate (e.g., 0.5), at low SNRs, the demodulator may experience higher thermal noise, may perform less accurate hard or soft decisions (e.g., maximum likelihood approximations or LLR calculations), and may experience poorer channel estimation. Therefore, at lower SNRs, the throughput of the upper even modulation order may be limited by the demodulator's capability notwithstanding the strength of the decoder, resulting in middle curve 804 being shown above high curve 806 at lower SNRs. Moreover, lower curve 802 shows higher throughput than middle curve 804 at lower SNRs for similar reasons.

Figure 9:
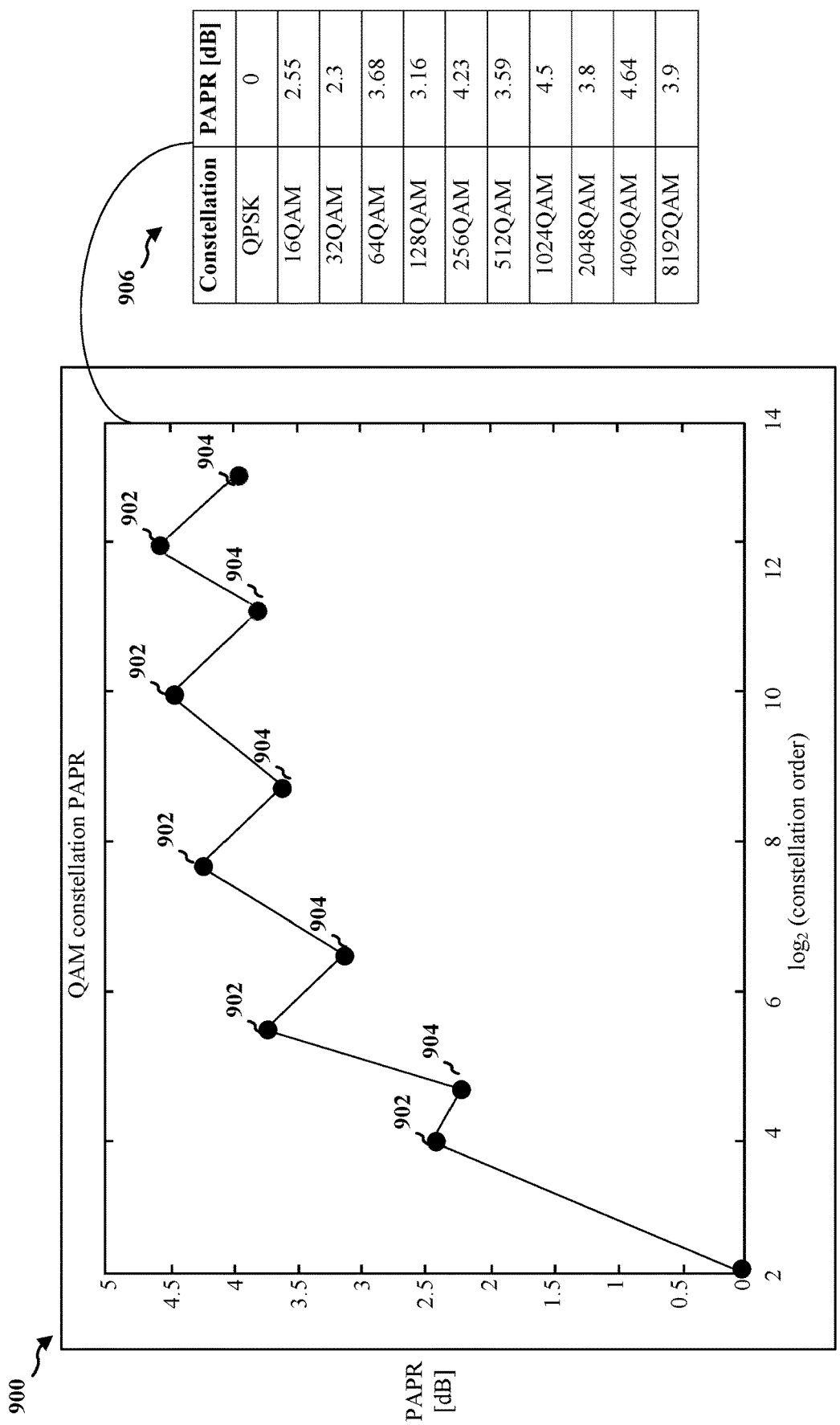
FIG. 9 illustrates an example of a chart showing an improvement in peak-to-average power ratios (PAPRs) of odd modulation order configurations over even modulation order configuration.

FIG. 9 illustrates an example 900 of a chart showing an improvement in PAPR resulting from odd modulation order configurations. As illustrated in the Figure, even modulation orders 902 generally are associated on average with approximately 0.8 dB more PAPR then the odd modulation orders 904 respectively adjacent to these even modulation orders. This average may be shown by the individual values of PAPR for different constellations in table 906 associated with the PAPR chart. Thus, a UE that utilizes odd modulation orders for its communications, for example at the cell edge, may achieve an average of 0.8 dB reduced PAPR, allowing the UE to use that reduced PAPR to increase its Tx power and improve signal quality.

Figure 10:
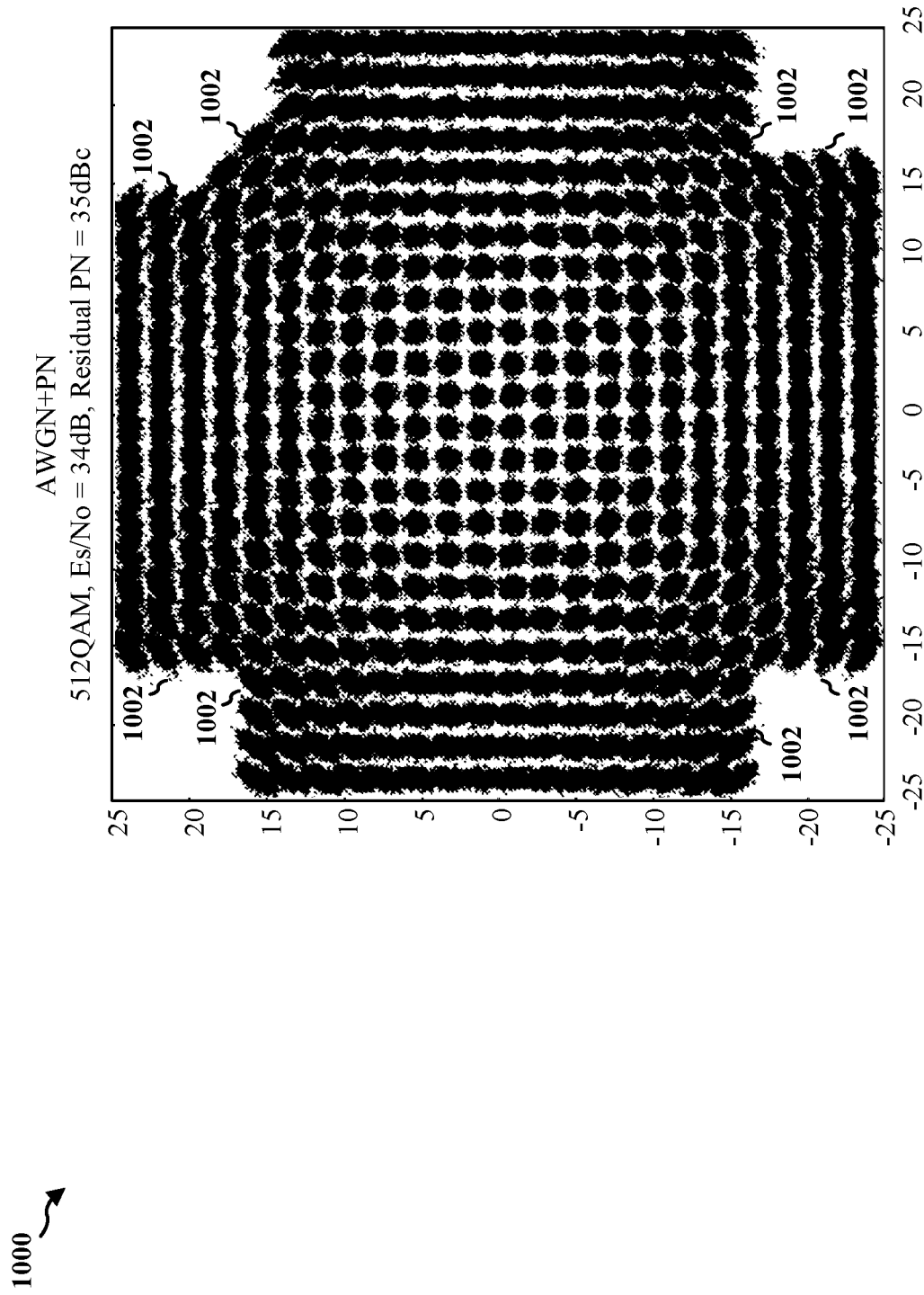
FIG. 10 illustrates an example of a non-square QAM constellation diagram indicating phase noise resiliency.

FIG. 10 illustrates an example 1000 of a non-square QAM constellation diagram indicating phase noise resiliency. As can be seen in the Figure, the various constellation points are slightly blurred due to thermal noise (additive white Gaussian noise (AWGN)) and phase noise (PN). In sub-THz environments where modulated symbols are carried on single carrier or DFT-OFDM waveforms, the phase noise may be significant and therefore the modulated symbols may experience phase rotation or arcing. Constellation points at larger distances from the point of origin of the chart may experience more phase rotation or longer arcs, especially constellation points at the corners of the constellation diagram where the distance is largest. For square QAM constellation diagrams, these corners may experience significant arcing and thus possibly overlap with neighboring constellation points, resulting in a high symbol error rate. However, for non-square QAM constellation diagrams, constellation points 1002 at the corners lack the neighboring constellation points present in square QAM constellations (since here the corners have been trimmed to form a cross shape), and therefore this risk of overlap is significantly reduced resulting in a lower symbol error rate. Thus, odd modulation orders may provide more resiliency to phase noise than even modulation orders. Additionally, PAPR may refer to the ratio of the peak distance of a constellation point to the average distance of a constellation point, and since non-square QAM constellations have lower peak distances than square QAM constellations (due to trimming of the corners), PAPR may be reduced.

Figure 11:
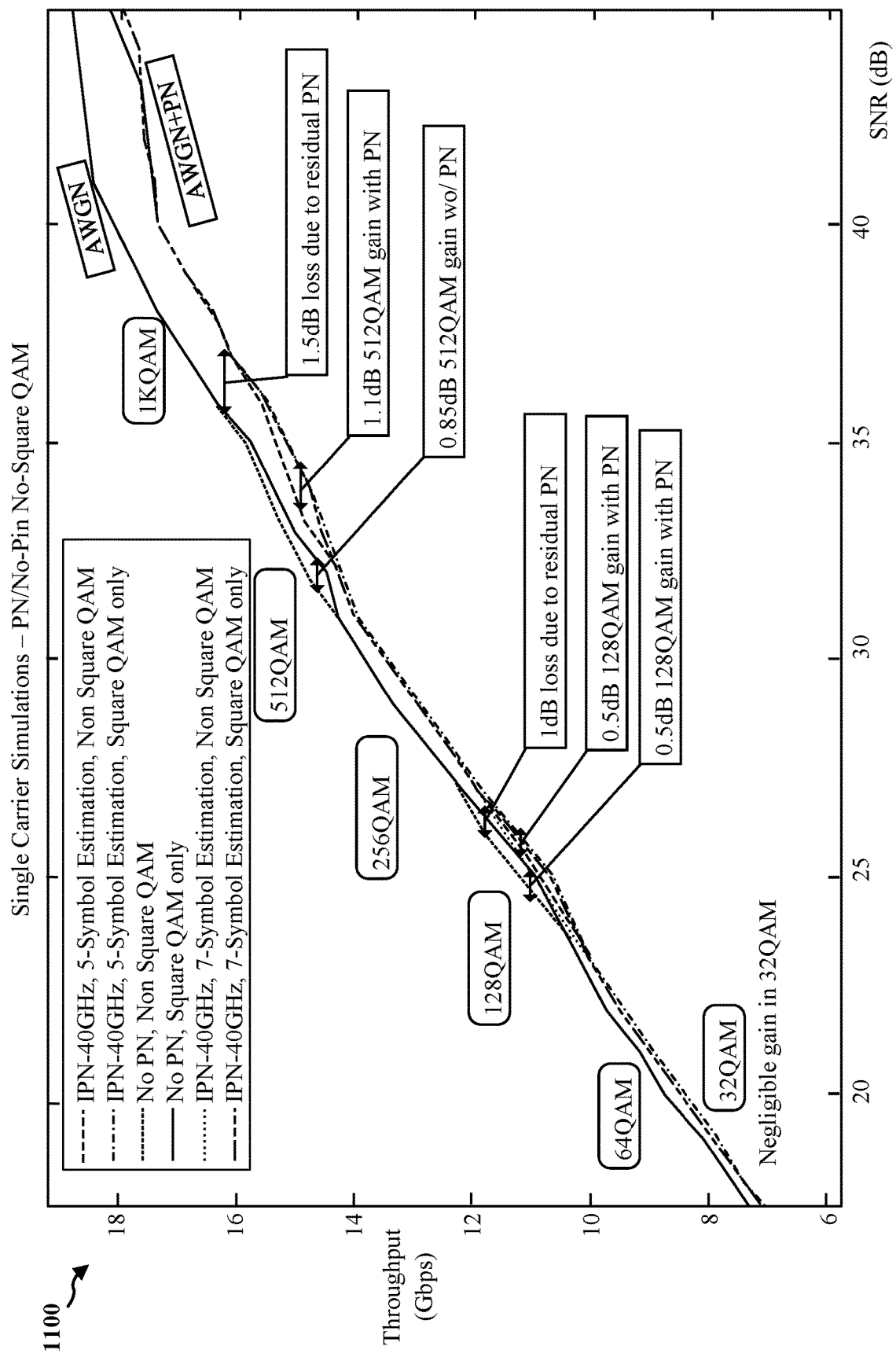
FIG. 11 illustrates an example of a chart showing a performance improvement achieved by odd modulation orders compared to even modulation orders in a single carrier waveform.

FIG. 11 illustrates an example 1100 of a chart showing the performance improvement that may be achieved by odd modulation orders compared to even modulation orders in a single carrier waveform. For instance, in the illustrated example of FIG. 11, gains of 0.5-0.85 dB in SNR without phase noise, and gains of 0.5-1.1 dB in SNR with phase noise, may be achieved by respective orders of non-square QAM over adjacent orders of square QAM to maintain a same respective throughput. If the PAPR reduction of 0.8 dB in SNR described with respect to FIG. 9 is added on top, then applying odd modulation orders for communication in single carrier waveforms may result in a total link budget benefit of 1.3 dB-1.9 dB over even modulation orders.

Figure 12:
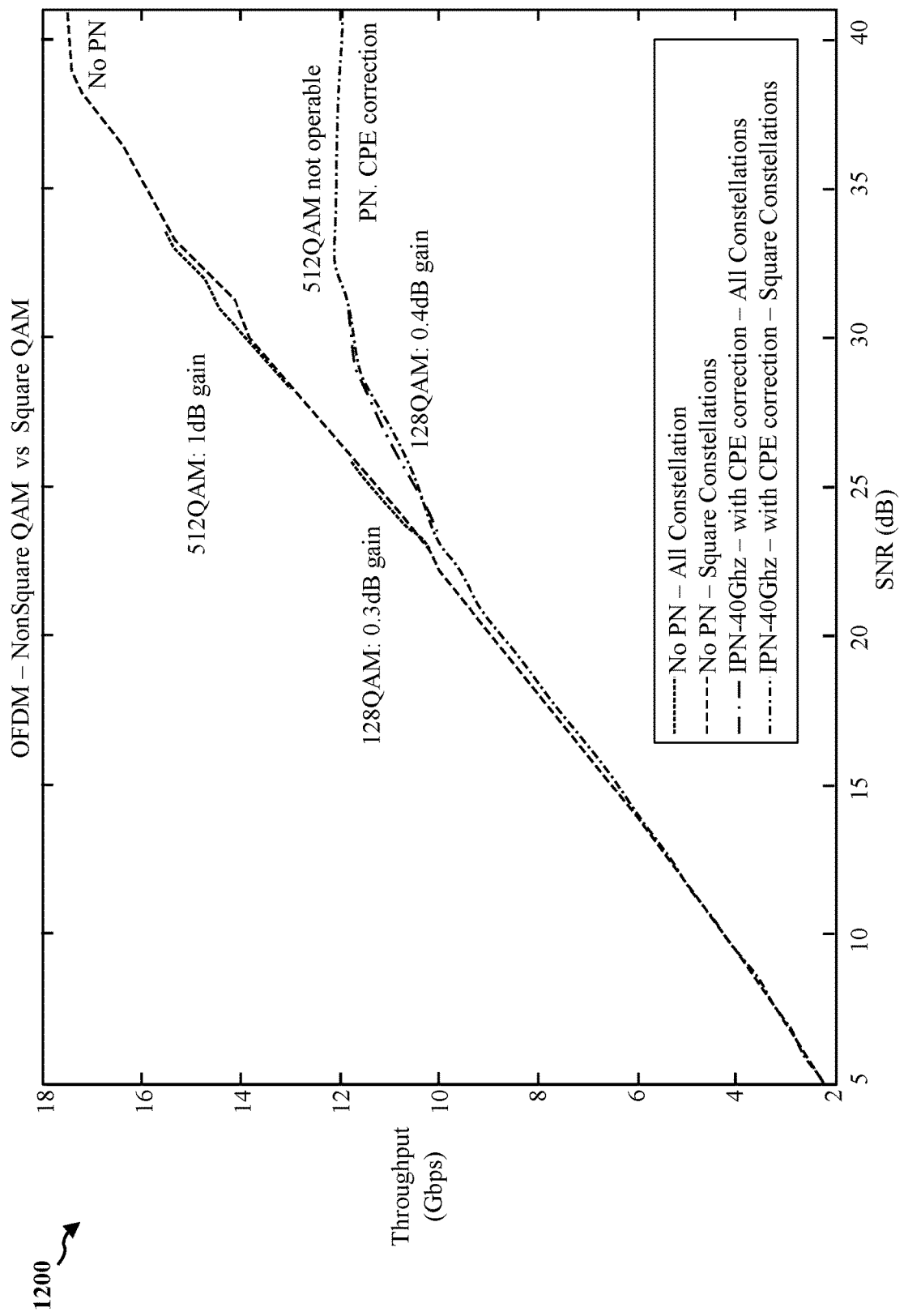
FIG. 12 illustrates an example of a chart showing a performance improvement achieved by odd modulation orders compared to even modulation orders in an orthogonal frequency division multiplexing (OFDM) waveform.

FIG. 12 illustrates an example 1200 of a chart showing the performance improvement that may be achieved by odd modulation orders compared to even modulation orders in an OFDM waveform. In the illustrated example of FIG. 12, a gain of 0.3-1 dB in SNR without phase noise may be achieved by respective orders of non-square QAM over adjacent orders of square QAM to maintain a same respective throughput. Thus, without phase noise, OFDM waveforms include similar performance improvement as single carrier waveforms. However, with phase noise, for OFDM waveforms, the receiver performs common phase error (CPE) correction after a certain SNR level, which ends up capping the throughput. For instance, in the illustrated example of FIG. 12, no gains may be achieved after 28 dB of SNR with phase noise since the throughput may be capped even at higher SNRs. As a result, the performance improvement of non-square QAM over square QAM may no longer be realized at high SNRs for OFDM waveforms. Therefore, a UE that has capability to demodulate OFDM waveforms using odd modulation orders for the improved SPEF, but that does not have capability to correct the phase noise to increase the throughput beyond this cap, may request OOM to be applied if an observed SNR is less than this threshold associated with maximal throughput (e.g., 28 dB of SNR). For example, the UE may send a request (e.g., request 618 in FIG. 6) to the base station (or other network device with base station functionality) to switch from the MCS table 502 to the extended MCS table 506. If the observed SNR is greater than this threshold, the UE may refrain from sending this request since the SPEF improvement may no longer be realized at such high SNRs due to the UE's incapability of correcting the phase noise beyond this limit. In contrast, if the UE is capable of correcting the phase noise such that the throughput may even continue above the threshold (e.g., above 28 dB), then the UE may send the request upon determining the observed SNR is greater than this threshold as previously described (e.g., at block 627 of FIG. 6).

Figure 13:
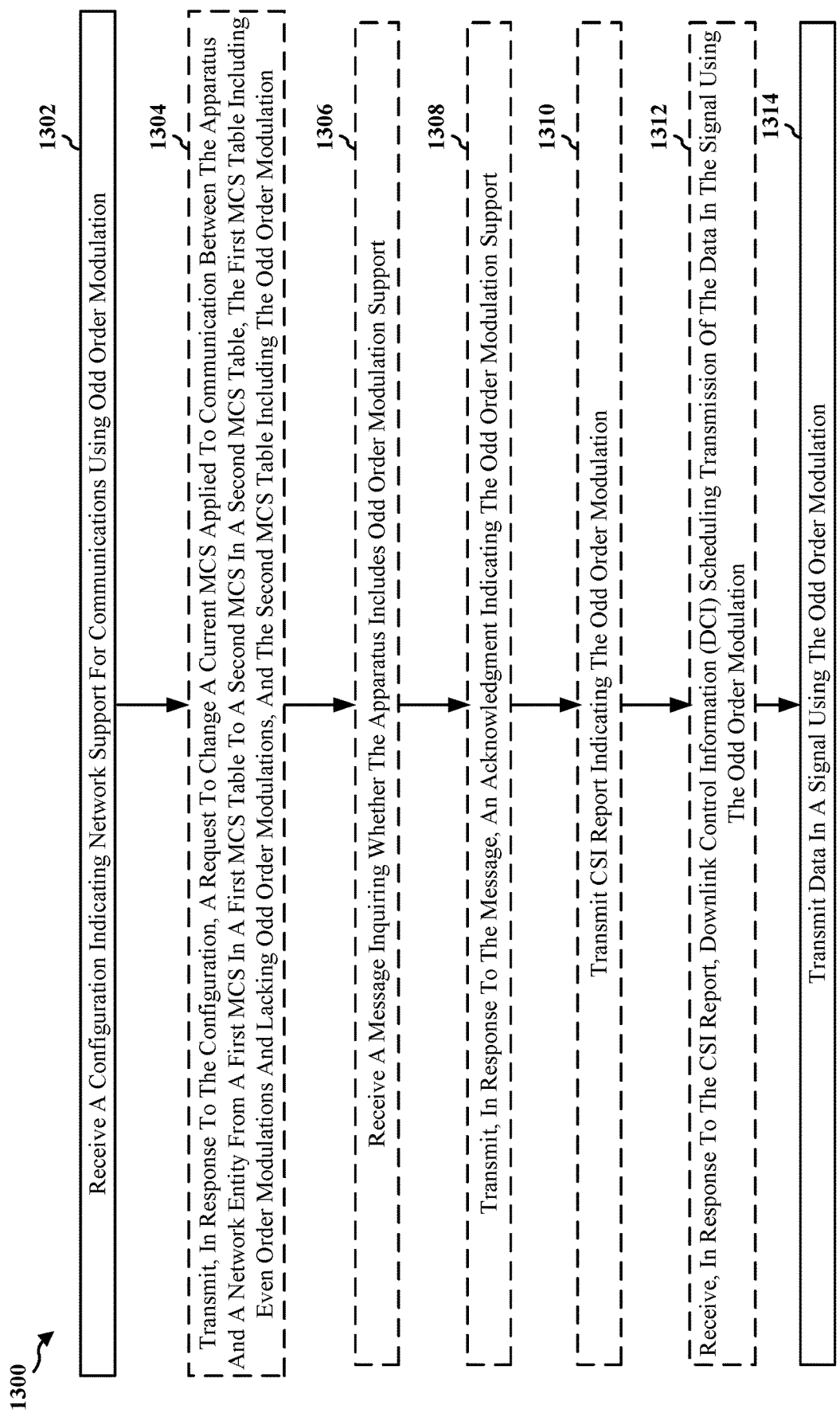
FIG. 13 is a flowchart of a method of wireless communication at a UE.

FIG. 13 is a flowchart 1300 of a method of wireless communication. The method may be performed by a UE (e.g., the UE 104, 350, 602; the apparatus 1502). Optional aspects are illustrated in dashed lines. The method allows a UE to apply odd order modulations to data transmissions or receptions based on network support being configured for odd order modulations.

At 1302, the UE receives a configuration indicating network support for communications using odd order modulation. For example, 1302 may be performed by configuration component 1540. In one example, the configuration may be a RRC configuration or a MAC-CE. In one example, the odd order modulation may be associated with a non-square QAM constellation or a non-square APSK constellation. For instance, referring to FIG. 6, the UE 602 may receive configuration 606 indicating network support 608 for OOM in communications between the UE 602 and a network device 604 (e.g., an MCS in extended MCS table 506 of FIG. 5 is supported by the network). For example, the configuration 606 may be a RRC configuration 610 or a MAC-CE 612, and the OOM may be associated with a non-square QAM constellation 614 (e.g., as illustrated in FIGS. 4A-4C) or a non-square APSK constellation 616. The network support 608 for OOM may be indicated via a flag, bit value, or information element (e.g., with a value '1' indicating network support exists and a value '0' indicating network support does not exist, or vice-versa). The network device 604 may support OOM (and thus network support 608 may be set accordingly), for example, if the network device 604 is capable of applying an MCS associated with an odd modulation order (e.g., non-square QAM or APSK) to its downlink transmissions. For instance, this capability may exist, and thus network support 608 for OOM may be present, if extended MCS table 506 of FIG. 5 has been pre-defined or configured with odd modulation orders that the network device may utilize in its downlink transmissions. For uplink transmissions, the network device 604 may similarly indicate network support 608 exists if the aforementioned MCS table has been pre-defined or configured such that the UE may similarly utilize its odd modulation orders for its uplink transmissions.

At 1304, the UE may transmit, in response to the configuration, a request to change a current MCS applied to communication between the UE and a network entity from a first MCS in a first MCS table to a second MCS in a second MCS table, the first MCS table including even order modulations and lacking odd order modulations, and the second MCS table including the odd order modulation. For example, 1304 may be performed by request component 1542. In one example, the request may be transmitted in a PUSCH or a PUCCH. In one example, the request may be included in a CSI report. For instance, referring to FIG. 6, the UE 602 may transmit, in response to configuration 606, request 618 to change current MCS 620 applied to communications between the UE 602 and the network device 604 (e.g., one of the MCSs 504 in MCS table 502) to new MCS 622 (e.g., one of the additional MCSs 508 in extended MCS table 506). The MCS table 502 may include even modulation order and coding rates but no odd modulation order and coding rates, such as illustrated in FIG. 5. In contrast, the extended MCS table 506 may include both odd modulation order and coding rates and even modulation order and coding rates. The UE 602 may transmit the request 618 in PUSCH 624 or in PUCCH 626, such as in UCI or CSI report 628, to achieve improvement in SPEF with the new MCS 622. In response to receiving the request 618, the network device 604 may transmit DCI 638 to the UE 602 scheduling a downlink or uplink transmission of data 640 using an odd order modulation MCS from the extended MCS table 506.

In one example, the UE may transmit the request at 1304 in response to a SNR of the configuration received at 1302 being at least equal to a phase noise SNR threshold. In another example, the UE may transmit the request at 1304 in response to a SNR of the configuration received at 1302 being at most equal to a cell edge SNR threshold. For instance, referring to FIG. 6, the UE 602 may determine whether to transmit request 618 to the network device 604 based on a currently observed SNR (e.g., an SNR of configuration 606 or other prior communication between UE 602 and network device 604). For example, at block 627, the UE 602 may check whether its observed SNR is at least equal to a phase noise SNR threshold (e.g., 28 dB), at which point phase noise correction may be required for maximal throughput. In response to this determination, the UE 602 may send the request 618 to switch its current MCS 620 (even modulation order) to new MCS 622 (odd modulation order) from the extended MCS table 506 to better cope with the phase noise at higher SNRs. Alternatively, at block 629, the UE 602 may check whether its observed SNR is at most equal to a cell edge SNR threshold (e.g., −5 dB), at which point a Tx power boost may be helpful. In response to the determination, the UE 602 may send the request 618 to switch its current MCS 620 (even modulation order) to new MCS 622 (odd modulation order) from the extended MCS table 506 to reduce its PAPR and increase its Tx power by almost 1 dB (e.g., as described above with respect to FIG. 9).

In one example, the second MCS table may further include a portion of the even order modulations of the first MCS table. For instance, referring to FIG. 5 and FIG. 8, the odd modulation orders may have better SPEF or throughput over even modulation orders at certain code rates. Therefore, the extended MCS table 506 may be designed to lack certain MCSs (i.e., omit certain rows) associated with even order modulations having code rates that result in less SPEF or throughput compared to adjacent MCSs with odd modulation orders. For example, additional MCSs 508 with 32QAM may result in better throughput than MCSs 504 with 64QAM at certain code rates, and therefore the extended MCS table 506 may omit the 64QAM MCSs with those certain code rates in corresponding MCSs 510. This point is illustrated in FIG. 5 by the quantities N[modulation order] for MCS table 502 and M[modulation order] for extended MCS table 506, where for QPSK or modulation order 2, M2<N2 (i.e., the quantity of corresponding MCSs 510 in extended MCS table 506 for QPSK is less than the quantity of MCSs 504 in MCS table 502 for QPSK), for 16QAM or modulation order 4, M4<N4 (i.e., the quantity of corresponding MCSs 510 in extended MCS table 506 for 16QAM is less than the quantity of MCSs 504 in MCS table 502 for 16QAM), and so forth.

At 1306, the UE may receive a message inquiring whether the apparatus includes odd order modulation support, and at 1308, the UE may transmit, in response to the message, an acknowledgment indicating the odd order modulation support. For example, 1306 may be performed by message component 1544, and 1308 may be performed by acknowledgement component 1546. In one example, the message may be received in a PDSCH or a PDCCH. For instance, referring to FIG. 6, the UE 602 may receive OOM support inquiry message 631 from network device 604 inquiring whether the UE is capable of demodulating odd order modulated signals. In response to the OOM support inquiry message 631, the UE 602 may transmit an acknowledgment 630 indicating whether or not the UE includes OOM support 632. For instance, if the UE 602 is capable of performing simplified soft demapping for non-square QAM as previously described in connection with LLR calculations (or otherwise is capable of demodulating odd order modulated signals with minimized complexity), the UE 602 may indicate in acknowledgment 630 that it includes OOM support 632. The OOM support 632 may be indicated via a flag, bit value, or information element (e.g., with a value '1' indicating UE support exists and a value '0' indicating UE support does not exist, or vice-versa). In response to receiving the acknowledgment 630, if OOM support 632 is indicated to exist, the network device 604 may determine to switch to the extended MCS table 506 and apply one of its MCSs 510 as the new MCS 622.

In one example, the signal (at 1314) uses the odd order modulation based on the odd order modulation support. For instance, referring to FIG. 6, in response to receiving the ACK 630 indicating OOM support 632, the network device 604 may transmit DCI 638 to the UE 602 scheduling a downlink or uplink transmission of data 640 using an odd order modulation MCS from the extended MCS table 506. Subsequently, the UE 602 may receive or transmit a signal 642 including the data 640 using the new MCS 622 (the odd order modulation).

At 1310, the UE may transmit a CSI report indicating the odd order modulation. For example, 1310 may be performed by CSI report component 1548. For instance, referring to FIG. 6, the UE 602 may transmit a CSI report 634 indicating the OOM 636 for the network device 604 to apply. For example, if the network device 604 indicated network support 608 for OOM (e.g., extended MCS table 506 may be applied), the UE may instead select CQI associated with an odd modulation order in the extended MCS table 506. This odd modulation order associated with the CQI may be indicated as OOM 636 in the CSI report 634. Thus, there may be multiple pre-defined CQI tables associated with different MCS (even modulation orders and odd modulation orders), similar to MCS table 502 and extended MCS table 506.

At 1312, the UE may receive, in response to the CSI report, DCI scheduling transmission of data in a signal using the odd order modulation. For example, 1312 may be performed by DCI component 1550. For instance, referring to FIG. 6, in response to receiving the CSI report 634 including the CQI indicating the OOM 636 (at 1310), the network device 604 may transmit DCI 638 to the UE 602 scheduling a downlink or uplink transmission of data 640 in signal 642 using an odd order modulation MCS from the extended MCS table 506.

Finally, at 1314, the UE may transmit (or receive) the data in the signal using the odd order modulation. For example, 1314 may be performed by signal component 1552. In one example, the data may be transmitted (or received) in a SC-FDMA waveform, a DFT-s-OFDM waveform, or a Nyquist pulse shaped single carrier waveform. For instance, referring to FIG. 6, the UE 602 may transmit signal 642 including the data 640 using the new MCS 622 (the odd order modulation). For example, the Tx processor 368 of UE 350 may perform odd order modulation using the following process: mapping respective codewords including odd numbers of bits of data 640 (symbols) to amplitudes of I signals and Q signals (or frequency or phase values), performing digital to analog conversion of the I and Q signals, and generating a carrier waveform and multiplying the carrier waveform with the I and Q signals. The signal may be carried in a SC-FDMA waveform 644, a DFT-s-OFDM waveform 646, a Nyquist pulse shaped single carrier waveform 648, or other waveform allowing for simpler phase noise suppression and lower PAPR. Alternatively, the UE 602 may receive signal 642 including data 640 using the new MCS 622 (the odd order modulation). For example, the Rx processor 356 of UE 350 may perform odd order demodulation using the following process: frequency shifting the signal 642 including respectively mapped codewords with an odd number of bits of data 640 (symbols) to equivalent baseband I and Q signals or an intermediate frequency (IF signal), performing analog-to-digital conversion and detecting the amplitudes of the I and Q signals or the frequency or phase of the IF signal, and mapping the quantized amplitudes, frequencies or phases to the codewords. Thus, the UE 602 may achieve improved SPEF, PAPR reduction, and phase noise resiliency over its prior MCS (the even order modulation).

Figure 14:
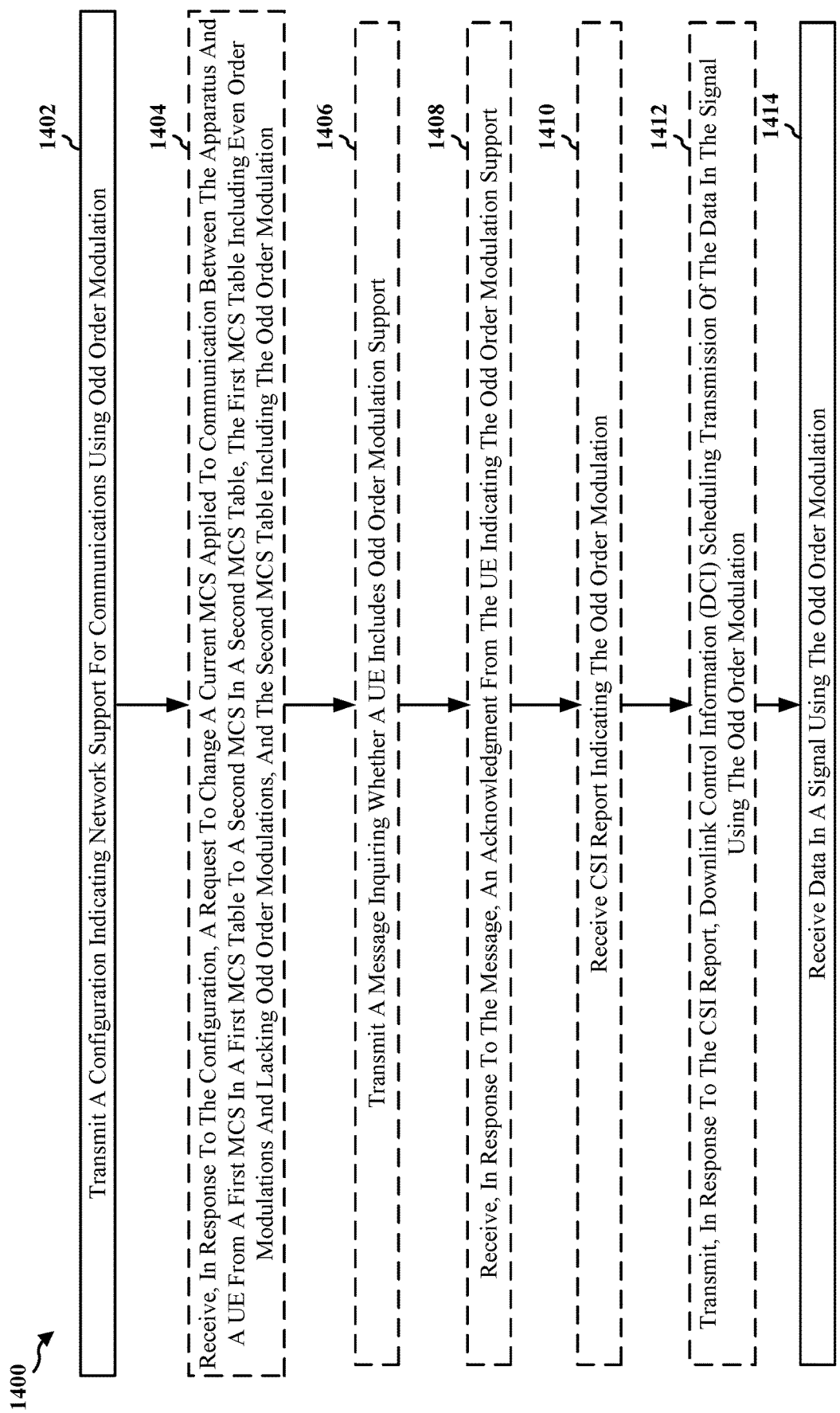
FIG. 14 is a flowchart of a method of wireless communication at a network entity such as a base station.

FIG. 14 is a flowchart 1400 of a method of wireless communication. The method may be performed by a network entity or network device such as a base station (e.g., the base station 102/180; disaggregated BS 181; network device 310, 604; the apparatus 1602). Optional aspects are illustrated in dashed lines. The method allows a network entity such as a base station to apply odd order modulations to data transmissions or receptions based on network support being configured for odd order modulations.

At 1402, the network entity transmits a configuration indicating network support for communications using odd order modulation. For example, 1402 may be performed by configuration component 1640. In one example, the configuration may be a RRC configuration or a MAC-CE. In one example, the odd order modulation may be associated with a non-square QAM constellation or a non-square APSK constellation. For instance, referring to FIG. 6, the network device 604 may transmit configuration 606 indicating network support 608 for OOM in communications between the UE 602 and a network device 604 (e.g., an MCS in extended MCS table 506 of FIG. 5 is supported by the network). For example, the configuration 606 may be a RRC configuration 610 or a MAC-CE 612, and the OOM may be associated with a non-square QAM constellation 614 (e.g., as illustrated in FIGS. 4A-4C) or a non-square APSK constellation 616. The network support 608 for OOM may be indicated via a flag, bit value, or information element (e.g., with a value '1' indicating network support exists and a value '0' indicating network support does not exist, or vice-versa). The network device 604 may support OOM (and thus network support 608 may be set accordingly), for example, if the network device 604 is capable of applying an MCS associated with an odd modulation order (e.g., non-square QAM or APSK) to its downlink transmissions. For instance, this capability may exist, and thus network support 608 for OOM may be present, if extended MCS table 506 of FIG. 5 has been pre-defined or configured with odd modulation orders that the network device may utilize in its downlink transmissions. For uplink transmissions, the network device 604 may similarly indicate network support 608 exists if the aforementioned MCS table has been pre-defined or configured such that the UE may similarly utilize its odd modulation orders for its uplink transmissions.

At 1404, the network entity may receive, in response to the configuration, a request to change a current MCS applied to communication between the network entity and a UE from a first MCS in a first MCS table to a second MCS in a second MCS table, the first MCS table including even order modulations and lacking odd order modulations, and the second MCS table including the odd order modulation. For example, 1404 may be performed by request component 1642. In one example, the request may be received in a PUSCH or a PUCCH. In one example, the request may be included in a CSI report. For instance, referring to FIG. 6, the network device 604 may receive, in response to configuration 606, request 618 to change current MCS 620 applied to communications between the UE 602 and the network device 604 (e.g., one of the MCSs 504 in MCS table 502) to new MCS 622 (e.g., one of the additional MCSs 508 in extended MCS table 506). The MCS table 502 may include even modulation order and coding rates but no odd modulation order and coding rates, such as illustrated in FIG. 5. In contrast, the extended MCS table 506 may include both odd modulation order and coding rates and even modulation order and coding rates. The network device 604 may receive the request 618 in PUSCH 624 or in PUCCH 626, such as in UCI or CSI report 628, to achieve improvement in SPEF with the new MCS 622. In response to receiving the request 618, the network device 604 may transmit DCI 638 to the UE 602 scheduling a downlink or uplink transmission of data 640 using an odd order modulation MCS from the extended MCS table 506.

In one example, the network entity may receive the request at 1404 in response to a SNR of the configuration received at 1402 being at least equal to a phase noise SNR threshold. In another example, the network entity may receive the request at 1404 in response to a SNR of the configuration received at 1402 being at most equal to a cell edge SNR threshold. For instance, referring to FIG. 6, the UE 602 may determine whether to transmit request 618 to the network device 604 based on a currently observed SNR (e.g., an SNR of configuration 606 or other prior communication between UE 602 and network device 604). For example, at block 627, the UE 602 may check whether its observed SNR is at least equal to a phase noise SNR threshold (e.g., 28 dB), at which point phase noise correction may be required for maximal throughput. In response to this determination, the UE 602 may send and the network device 604 may obtain the request 618 to switch its current MCS 620 (even modulation order) to new MCS 622 (odd modulation order) from the extended MCS table 506 to better cope with the phase noise at higher SNRs. Alternatively, at block 629, the UE 602 may check whether its observed SNR is at most equal to a cell edge SNR threshold (e.g., −5 dB), at which point a Tx power boost may be helpful. In response to the determination, the UE 602 may send and the network device 604 may obtain the request 618 to switch its current MCS 620 (even modulation order) to new MCS 622 (odd modulation order) from the extended MCS table 506 to reduce its PAPR and increase its Tx power by almost 1 dB (e.g., as described above with respect to FIG. 9).

In one example, the second MCS table may further include a portion of the even order modulations of the first MCS table. For instance, referring to FIG. 5 and FIG. 8, the odd modulation orders may have better SPEF or throughput over even modulation orders at certain code rates. Therefore, the extended MCS table 506 may be designed to lack certain MCSs (i.e., omit certain rows) associated with even order modulations having code rates that result in less SPEF or throughput compared to adjacent MCSs with odd modulation orders. For example, additional MCSs 508 with 32QAM may result in better throughput than MCSs 504 with 64QAM at certain code rates, and therefore the extended MCS table 506 may omit the 64QAM MCSs with those certain code rates in corresponding MCSs 510. This point is illustrated in FIG. 5 by the quantities N[modulation order] for MCS table 502 and M[modulation order] for extended MCS table 506, where for QPSK or modulation order 2, M2<N2 (i.e., the quantity of corresponding MCSs 510 in extended MCS table 506 for QPSK is less than the quantity of MCSs 504 in MCS table 502 for QPSK), for 16QAM or modulation order 4, M4<N4 (i.e., the quantity of corresponding MCSs 510 in extended MCS table 506 for 16QAM is less than the quantity of MCSs 504 in MCS table 502 for 16QAM), and so forth.

At 1406, the network entity may transmit a message inquiring whether a UE includes odd order modulation support, and at 1408, the network entity may receive, in response to the message, an acknowledgment from the UE indicating the odd order modulation support. For example, 1406 may be performed by message component 1644, and 1408 may be performed by acknowledgment component 1646. In one example, the message may be transmitted in a PDSCH or a PDCCH. For instance, referring to FIG. 6, the network device 604 may transmit OOM support inquiry message 631 to UE 602 inquiring whether the UE is capable of demodulating odd order modulated signals. In response to the OOM support inquiry message 631, the UE 602 may transmit and the network device 604 may receive an acknowledgment 630 indicating whether or not the UE includes OOM support 632. For instance, if the UE 602 is capable of performing simplified soft demapping for non-square QAM as previously described in connection with LLR calculations (or otherwise is capable of demodulating odd order modulated signals with minimized complexity), the UE 602 may indicate in acknowledgment 630 that it includes OOM support 632. The OOM support 632 may be indicated via a flag, bit value, or information element (e.g., with a value '1' indicating UE support exists and a value '0' indicating UE support does not exist, or vice-versa). In response to receiving the acknowledgment 630, if OOM support 632 is indicated to exist, the network device 604 may determine to switch to the extended MCS table 506 and apply one of its MCSs 510 as the new MCS 622.

In one example, the signal (at 1414) uses the odd order modulation based on the odd order modulation support. For instance, referring to FIG. 6, in response to receiving the ACK 630 indicating OOM support 632, the network device 604 may transmit DCI 638 to the UE 602 scheduling a downlink or uplink transmission of data 640 using an odd order modulation MCS from the extended MCS table 506. Subsequently, the UE 602 may receive or transmit a signal 642 including the data 640 using the new MCS 622 (the odd order modulation).

At 1410, the network entity may receive a CSI report indicating the odd order modulation. For example, 1410 may be performed by CSI report component 1648. For instance, referring to FIG. 6, the network device 604 may receive CSI report 634 from UE 602 indicating the OOM 636 for the network device 604 to apply. For example, if the network device 604 indicated network support 608 for OOM (e.g., extended MCS table 506 may be applied), the UE 602 may instead select CQI associated with an odd modulation order in the extended MCS table 506. This odd modulation order associated with the CQI may be indicated as OOM 636 in the CSI report 634. Thus, there may be multiple pre-defined CQI tables associated with different MCS (even modulation orders and odd modulation orders), similar to MCS table 502 and extended MCS table 506.

At 1412, the network entity may transmit, in response to the CSI report, DCI scheduling transmission of data in a signal using the odd order modulation. For example, 1412 may be performed by DCI component 1650. For instance, referring to FIG. 6, in response to receiving the CSI report 634 including the CQI indicating the OOM 636 (at 1410), the network device 604 may transmit DCI 638 to the UE 602 scheduling a downlink or uplink transmission of data 640 in signal 642 using an odd order modulation MCS from the extended MCS table 506.

Finally, at 1414, the network entity may receive (or transmit) the data in the signal using the odd order modulation. For example, 1414 may be performed by signal component 1652. In one example, the data may be received (or transmitted) in a SC-FDMA waveform, a DFT-s-OFDM waveform, or a Nyquist pulse shaped single carrier waveform. For instance, referring to FIG. 6, the network device 604 may receive signal 642 including the data 640 using the new MCS 622 (the odd order modulation). For example, the Rx processor 370 of network device 310 may perform odd order demodulation using the following process: frequency shifting the signal 642 including respectively mapped codewords with an odd number of bits of data 640 (symbols) to equivalent baseband I and Q signals or an intermediate frequency (IF signal), performing analog-to-digital conversion and detecting the amplitudes of the I and Q signals or the frequency or phase of the IF signal, and mapping the quantized amplitudes, frequencies or phases to the codewords. The signal may be carried in a SC-FDMA waveform 644, a DFT-s-OFDM waveform 646, a Nyquist pulse shaped single carrier waveform 648, or other waveform allowing for simpler phase noise suppression and lower PAPR. Alternatively, the network device 604 may transmit signal 642 including data 640 using the new MCS 622 (the odd order modulation). For example, the Tx processor 316 of network device 310 may perform odd order modulation using the following process: mapping respective codewords including odd numbers of bits of data 640 (symbols) to amplitudes of I signals and Q signals (or frequency or phase values), performing digital to analog conversion of the I and Q signals, and generating a carrier waveform and multiplying the carrier waveform with the I and Q signals. Thus, the network device 604 may achieve improved SPEF, PAPR reduction, and phase noise resiliency over its prior MCS (the even order modulation).

Figure 15:
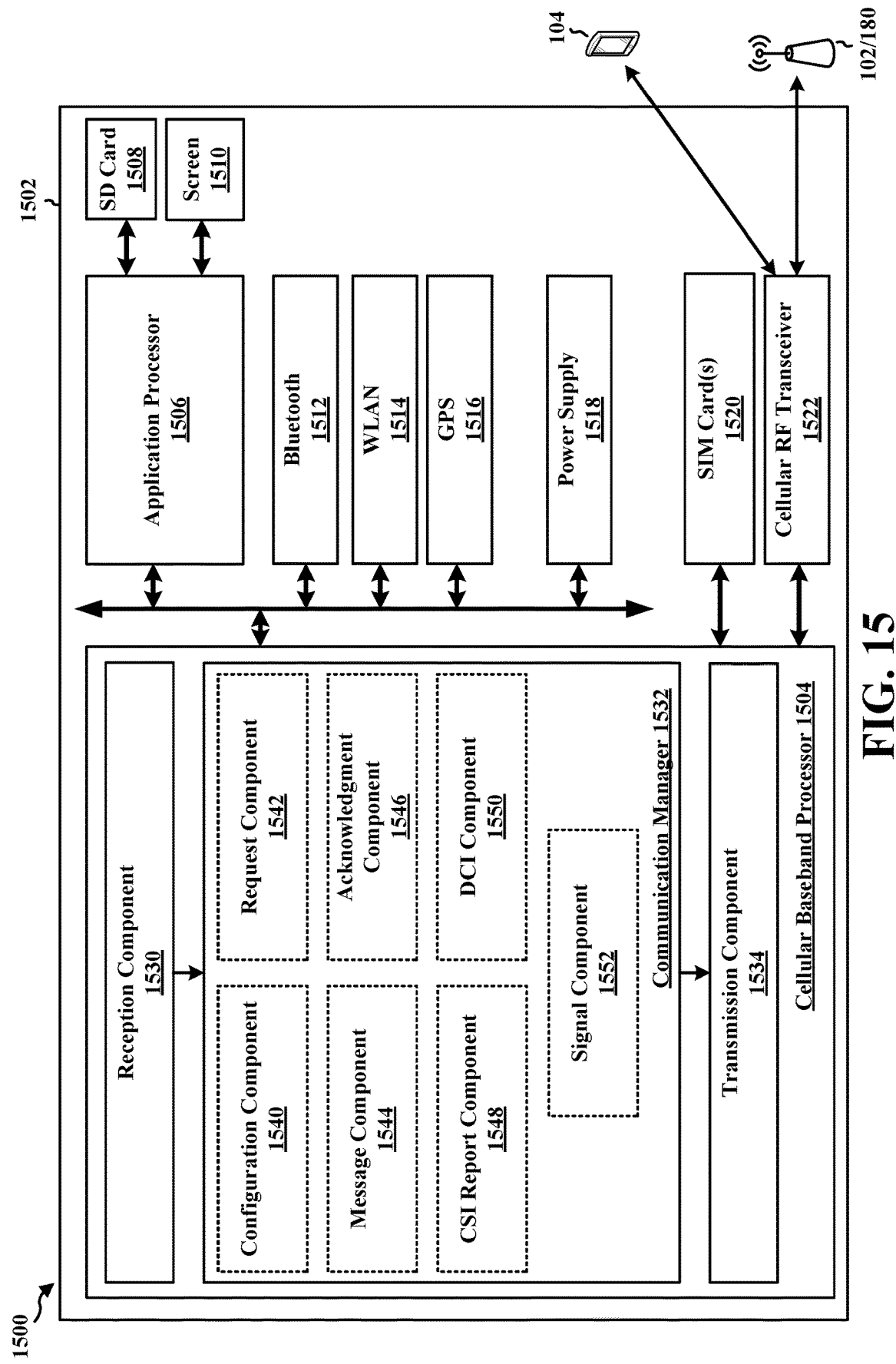
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a configuration component 1540 that is configured to receive a configuration indicating network support for communications using odd order modulation, e.g., as described in connection with 1302.

The communication manager 1532 further includes a request component 1542 that receives input in the form of the configuration from the configuration component 1540 and is configured to transmit, in response to the configuration, a request to change a current MCS applied to communication between the apparatus and a network entity from a first MCS in a first MCS table to a second MCS in a second MCS table, the first MCS table including even order modulations and lacking odd order modulations, and the second MCS table including the odd order modulation, e.g., as described in connection with 1304.

The communication manager 1532 further includes a message component 1544 that receives input in the form of the configuration from the configuration component 1540 and is configured to receive a message inquiring whether the apparatus includes odd order modulation support, e.g., as described in connection with 1306.

The communication manager 1532 further includes an acknowledgment component 1546 that receives input in the form of the configuration from the configuration component 1540 and the message from the message component 1544 and is configured to transmit, in response to the message, an acknowledgment indicating the odd order modulation support, e.g., as described in connection with 1308.

The communication manager 1532 further includes a CSI report component 1548 that receives input in the form of the configuration from the configuration component 1540 and is configured to transmit a CSI report indicating the odd order modulation, e.g., as described in connection with 1310.

The communication manager 1532 further includes a DCI component 1550 that receives input in the form of the configuration from the configuration component 1540 and the CSI report from the CSI report component 1548 is configured to receive, in response to the CSI report, DCI scheduling transmission of the data in the signal using the odd order modulation, e.g., as described in connection with 1312.

The communication manager 1532 further includes a signal component 1552 that receives input in the form of the configuration from the configuration component 1540 and is configured to transmit data in a signal using the odd order modulation, e.g., as described in connection with 1314.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for receiving a configuration indicating network support for communications using odd order modulation; and means for transmitting data in a signal using the odd order modulation.

In one configuration, the odd order modulation is associated with a non-square quadrature amplitude modulation (QAM) constellation or a non-square amplitude and phase-shift keying (APSK) constellation.

In one configuration, the data is transmitted in a single-carrier frequency division multiple access (SC-FDMA) waveform, a Discrete Fourier transform-spread orthogonal frequency-division multiplexing (DFT-s-OFDM) waveform, or a Nyquist pulse shaped single carrier waveform.

In one configuration, the configuration is a radio resource control (RRC) configuration or a medium access control (MAC) control element (MAC-CE).

In one configuration, the means for transmitting is further configured to transmit, in response to the configuration, a request to change a current modulation and coding scheme (MCS) applied to communication between the apparatus and a network entity from a first MCS in a first MCS table to a second MCS in a second MCS table, the first MCS table including even order modulations and lacking odd order modulations, and the second MCS table including the odd order modulation.

In one configuration, the request is transmitted in a physical uplink shared channel (PUSCH) or a physical uplink control channel (PUCCH).

In one configuration, the means for transmitting is further configured to transmit the request in response to a signal to noise ratio (SNR) of the configuration being at least equal to a phase noise SNR threshold.

In one configuration, the means for transmitting is further configured to transmit the request in response to a signal to noise ratio (SNR) of the configuration being at most equal to a cell edge SNR threshold.

In one configuration, the request is included in a channel state information (CSI) report.

In one configuration, the second MCS table further includes a portion of the even order modulations of the first MCS table.

In one configuration, the means for receiving is further configured to receive a message inquiring whether the apparatus includes odd order modulation support; and the means for transmitting is further configured to transmit, in response to the message, an acknowledgment indicating the odd order modulation support; wherein the signal uses the odd order modulation based on the odd order modulation support.

In one configuration, the message is received in a physical downlink shared channel (PDSCH) or a physical downlink control channel (PDCCH).

In one configuration, the means for transmitting is further configured to transmit a channel state information (CSI) report indicating the odd order modulation; and the means for receiving is further configured to receive, in response to the CSI report, downlink control information (DCI) scheduling transmission of the data in the signal using the odd order modulation.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
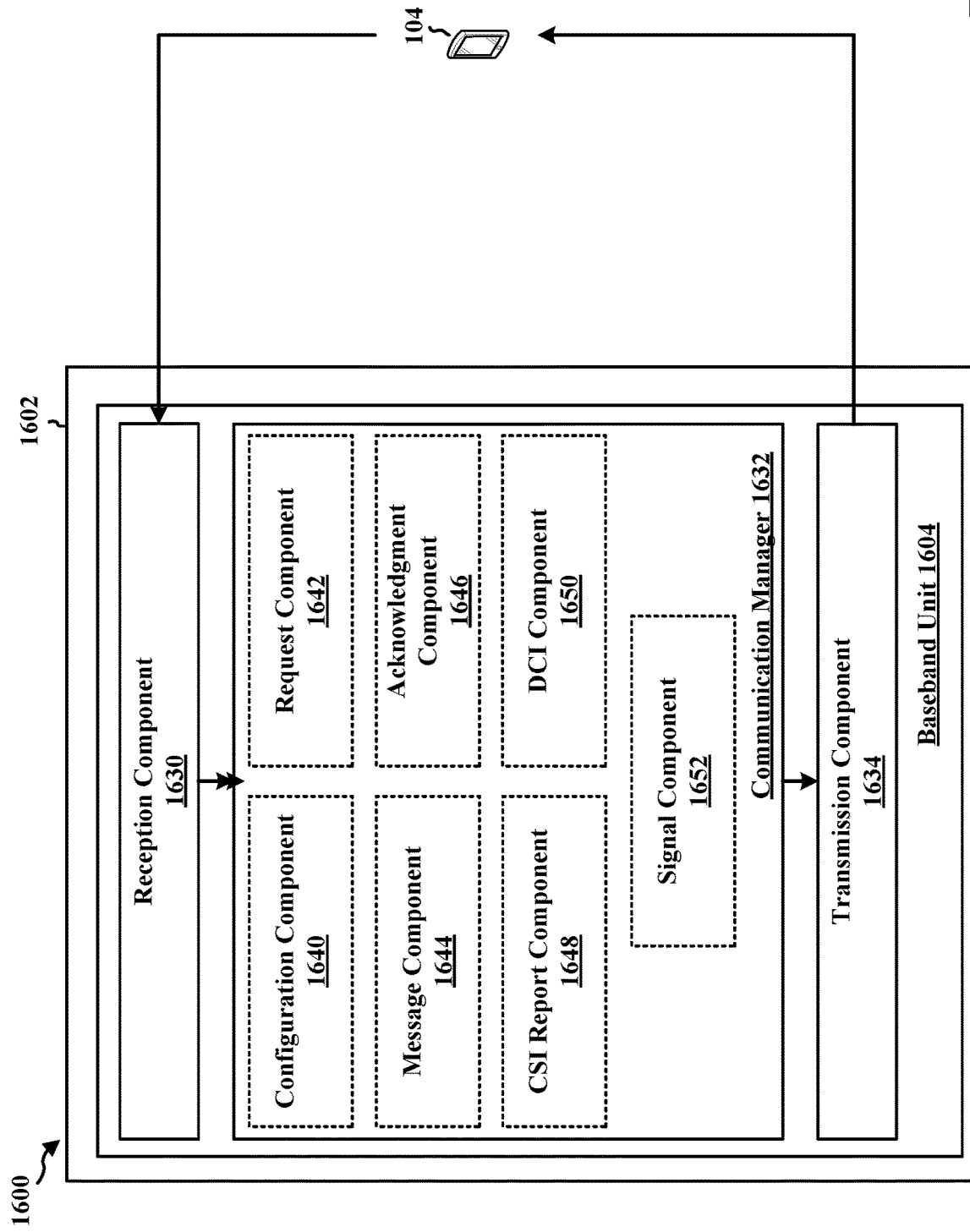
FIG. 16 is a diagram illustrating another example of a hardware implementation for another example apparatus.

FIG. 16 is a diagram 1600 illustrating an example of a hardware implementation for an apparatus 1602. The apparatus 1602 is a network entity or network device such as a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the network device 310 and may include the memory 376 and/or at least one of the TX processor 316, the RX processor 370, and the controller/processor 375.

The communication manager 1632 includes a configuration component 1640 that is configured to transmit a configuration indicating network support for communications using odd order modulation, e.g., as described in connection with 1402.

The communication manager 1632 further includes a request component 1642 that receives input in the form of the configuration from the configuration component 1640 and is configured to receive, in response to the configuration, a request to change a current MCS applied to communication between the apparatus and a UE from a first MCS in a first MCS table to a second MCS in a second MCS table, the first MCS table including even order modulations and lacking odd order modulations, and the second MCS table including the odd order modulation, e.g., as described in connection with 1404.

The communication manager 1632 further includes a message component 1644 that receives input in the form of the configuration from the configuration component 1640 and is configured to transmit a message inquiring whether a UE includes odd order modulation support, e.g., as described in connection with 1406.

The communication manager 1632 further includes an acknowledgment component 1646 that receives input in the form of the configuration from the configuration component 1640 and the message from the message component 1644 and is configured to receive, in response to the message, an acknowledgment from the UE indicating the odd order modulation support, e.g., as described in connection with 1408.

The communication manager 1632 further includes a CSI report component 1648 that receives input in the form of the configuration from the configuration component 1640 and is configured to receive a CSI report indicating the odd order modulation, e.g., as described in connection with 1410.

The communication manager 1632 further includes a DCI component 1650 that receives input in the form of the configuration from the configuration component 1640 and the CSI report from the CSI report component 1648 is configured to transmit, in response to the CSI report, DCI scheduling transmission of the data in the signal using the odd order modulation, e.g., as described in connection with 1412.

The communication manager 1632 further includes a signal component 1652 that receives input in the form of the configuration from the configuration component 1640 and is configured to receive data in a signal using the odd order modulation, e.g., as described in connection with 1414.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting a configuration indicating network support for communications using odd order modulation; and means for receiving data in a signal using the odd order modulation.

In one configuration, the odd order modulation is associated with a non-square quadrature amplitude modulation (QAM) constellation or a non-square amplitude and phase-shift keying (APSK) constellation.

In one configuration, the data is received in a single-carrier frequency division multiple access (SC-FDMA) waveform, a Discrete Fourier transform-spread orthogonal frequency-division multiplexing (DFT-s-OFDM) waveform, or a Nyquist pulse shaped single carrier waveform.

In one configuration, the configuration is a radio resource control (RRC) configuration or a medium access control (MAC) control element (MAC-CE).

In one configuration, the means for receiving is further configured to receive, in response to the configuration, a request to change a current modulation and coding scheme (MCS) applied to communication between the apparatus and a UE from a first MCS in a first MCS table to a second MCS in a second MCS table, the first MCS table including even order modulations and lacking odd order modulations, and the second MCS table including the odd order modulation.

In one configuration, the request is received in a physical uplink shared channel (PUSCH) or a physical uplink control channel (PUCCH).

In one configuration, the means for receiving is further configured to receive the request in response to a signal to noise ratio (SNR) of the configuration being at least equal to a phase noise SNR threshold.

In one configuration, the means for receiving is further configured to receive the request in response to a signal to noise ratio (SNR) of the configuration being at most equal to a cell edge SNR threshold.

In one configuration, the request is included in a channel state information (CSI) report.

In one configuration, the second MCS table further includes a portion of the even order modulations of the first MCS table.

In one configuration, the means for transmitting is further configured to transmit a message inquiring whether a UE includes odd order modulation support; and the means for receiving is further configured to receive, in response to the message, an acknowledgment from the UE indicating the odd order modulation support; wherein the signal uses the odd order modulation based on the odd order modulation support.

In one configuration, the message is transmitted in a physical downlink shared channel (PDSCH) or a physical downlink control channel (PDCCH).

In one configuration, the means for receiving is further configured to receive a channel state information (CSI) report indicating the odd order modulation; and the means for transmitting is further configured to transmit, in response to the CSI report, downlink control information (DCI) scheduling transmission of the data in the signal using the odd order modulation.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, aspects of the present disclosure allow for a network entity (e.g., a base station or other network device with base station functionality) to configure odd modulation orders to be applied to downlink or uplink transmissions via signaling between the network entity and the UE, so that the improved SPEF, PAPR reduction, and phase noise mitigation associated with odd modulation orders may be realized. If the UE is currently communicating with the network entity using even order modulation in one MCS table, but the UE is capable of demodulating odd order modulated signals with minimized complexity, the UE may request the network entity to switch from that MCS table to an extended MCS table including MCSs associated with odd order modulation as well as even order modulation, thereby benefitting from the associated SPEF improvement with odd modulation orders. In another example, if the UE is also capable of correcting phase noise (typically in single-carrier or DFT-OFDM waveforms), the UE may send such request to the network entity to apply the extended MCS table to similarly benefit from improved phase noise resiliency. In a further example, if the UE is located at a cell edge but includes this capability of demodulating odd order modulated signals, the UE may request the network entity to switch to the extended MCS table to result in lower PAPR, which in turn may allow the UE's transmission power to increase by 0.8 dB, providing significant improvement to signal quality at the cell edge. Additionally, the extended MCS table may include the best MCSs from MCS table, while omitting those MCSs which do not add value over their adjacent odd modulation order counterparts, thereby saving communication overhead of MCS configurations and lightening CSI reporting complexity.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is an apparatus for wireless communication, including: a processor; memory coupled with the processor; and instructions stored in the memory and operable, when executed by the processor, to cause the apparatus to: receive a configuration indicating network support for communications using odd order modulation; and transmit data in a signal using the odd order modulation.

Aspect 2 is the apparatus of Aspect 1, wherein the odd order modulation is associated with a non-square quadrature amplitude modulation (QAM) constellation or a non-square amplitude and phase-shift keying (APSK) constellation.

Aspect 3 is the apparatus of Aspects 1 or 2, wherein the data is transmitted in a single-carrier frequency division multiple access (SC-FDMA) waveform, a Discrete Fourier transform-spread orthogonal frequency-division multiplexing (DFT-s-OFDM) waveform, or a Nyquist pulse shaped single carrier waveform.

Aspect 4 is the apparatus of any of Aspects 1 to 3, wherein the configuration is a radio resource control (RRC) configuration or a medium access control (MAC) control element (MAC-CE).

Aspect 5 is the apparatus of any of Aspects 1 to 4, wherein the instructions, when executed by the processor, further cause the apparatus to: transmit, in response to the configuration, a request to change a current modulation and coding scheme (MCS) applied to communication between the apparatus and a network entity from a first MCS in a first MCS table to a second MCS in a second MCS table, the first MCS table including even order modulations and lacking odd order modulations, and the second MCS table including the odd order modulation.

Aspect 6 is the apparatus of Aspect 5, wherein the request is transmitted in a physical uplink shared channel (PUSCH) or a physical uplink control channel (PUCCH).

Aspect 7 is the apparatus of Aspects 5 or 6, wherein the instructions, when executed by the processor, further cause the apparatus to transmit the request in response to a signal to noise ratio (SNR) of the configuration being at least equal to a phase noise SNR threshold.

Aspect 8 is the apparatus of Aspects 5 or 6, wherein the instructions, when executed by the processor, further cause the apparatus to transmit the request in response to a signal to noise ratio (SNR) of the configuration being at most equal to a cell edge SNR threshold.

Aspect 9 is the apparatus of any of Aspects 5 to 8, wherein the request is included in a channel state information (CSI) report.

Aspect 10 is the apparatus of any of Aspects 1 to 9, wherein the second MCS table further includes a portion of the even order modulations of the first MCS table.

Aspect 11 is the apparatus of any of Aspects 1 to 10, wherein the instructions, when executed by the processor, further cause the apparatus to: receive a message inquiring whether the apparatus includes odd order modulation support; and transmit, in response to the message, an acknowledgment indicating the odd order modulation support; wherein the signal uses the odd order modulation based on the odd order modulation support.

Aspect 12 is the apparatus of Aspect 11, wherein the message is received in a physical downlink shared channel (PDSCH) or a physical downlink control channel (PDCCH).

Aspect 13 is the apparatus of any of Aspects 1 to 12, wherein the instructions, when executed by the processor, further cause the apparatus to: transmit a channel state information (CSI) report indicating the odd order modulation; and receive, in response to the CSI report, downlink control information (DCI) scheduling transmission of the data in the signal using the odd order modulation.

Aspect 14 is an apparatus for wireless communication, including: a processor; memory coupled with the processor; and instructions stored in the memory and operable, when executed by the processor, to cause the apparatus to: transmit a configuration indicating network support for communications using odd order modulation; and receive data in a signal using the odd order modulation.

Aspect 15 is the apparatus of Aspect 14, wherein the odd order modulation is associated with a non-square quadrature amplitude modulation (QAM) constellation or a non-square amplitude and phase-shift keying (APSK) constellation.

Aspect 16 is the apparatus of Aspects 14 or 15, wherein the data is received in a single-carrier frequency division multiple access (SC-FDMA) waveform, a Discrete Fourier transform-spread orthogonal frequency-division multiplexing (DFT-s-OFDM) waveform, or a Nyquist pulse shaped single carrier waveform.

Aspect 17 is the apparatus of any of Aspects 14 to 16, wherein the configuration is a radio resource control (RRC) configuration or a medium access control (MAC) control element (MAC-CE).

Aspect 18 is the apparatus of any of Aspects 14 to 17, wherein the instructions, when executed by the processor, further cause the apparatus to: receive, in response to the configuration, a request to change a current modulation and coding scheme (MCS) applied to communication between the apparatus and a user equipment (UE) from a first MCS in a first MCS table to a second MCS in a second MCS table, the first MCS table including even order modulations and lacking odd order modulations, and the second MCS table including the odd order modulation.

Aspect 19 is the apparatus of Aspect 18, wherein the request is received in a physical uplink shared channel (PUSCH) or a physical uplink control channel (PUCCH).

Aspect 20 is the apparatus of Aspects 18 or 19, wherein the instructions, when executed by the processor, further cause the apparatus to receive the request in response to a signal to noise ratio (SNR) of the configuration being at least equal to a phase noise SNR threshold.

Aspect 21 is the apparatus of Aspects 18 or 19, wherein the instructions, when executed by the processor, further cause the apparatus to receive the request in response to a signal to noise ratio (SNR) of the configuration being at most equal to a cell edge SNR threshold.

Aspect 22 is the apparatus of any of Aspects 18 to 21, wherein the request is included in a channel state information (CSI) report.

Aspect 23 is the apparatus of any of Aspects 14 to 22, wherein the second MCS table further includes a portion of the even order modulations of the first MCS table.

Aspect 24 is the apparatus of any of Aspects 14 to 23, wherein the instructions, when executed by the processor, further cause the apparatus to: transmit a message inquiring whether a user equipment (UE) includes odd order modulation support; and receive, in response to the message, an acknowledgment from the UE indicating the odd order modulation support; wherein the signal uses the odd order modulation based on the odd order modulation support.

Aspect 25 is the apparatus of Aspect 24, wherein the message is transmitted in a physical downlink shared channel (PDSCH) or a physical downlink control channel (PDCCH).

Aspect 26 is the apparatus of any of Aspects 14 to 25, wherein the instructions, when executed by the processor, further cause the apparatus to: receive a channel state information (CSI) report indicating the odd order modulation; and transmit, in response to the CSI report, downlink control information (DCI) scheduling transmission of the data in the signal using the odd order modulation.

Aspect 27 is a method of wireless communication at a user equipment (UE), including: receiving a configuration indicating network support for communications using odd order modulation; and transmitting data in a signal using the odd order modulation.

Aspect 28 is the method of Aspect 27, further including: transmitting, in response to the configuration, a request to change a current modulation and coding scheme (MCS) applied to communication between the UE and a network entity from a first MCS in a first MCS table to a second MCS in a second MCS table, the first MCS table including even order modulations and lacking odd order modulations, and the second MCS table including the odd order modulation.

Aspect 29 is a method of wireless communication at a network entity, including: transmitting a configuration indicating network support for communications using odd order modulation; and receiving data in a signal using the odd order modulation.

Aspect 30 is the method of Aspect 29, further including: receiving, in response to the configuration, a request to change a current modulation and coding scheme (MCS) applied to communication between the network entity and a user equipment (UE) from a first MCS in a first MCS table to a second MCS in a second MCS table, the first MCS table including even order modulations and lacking odd order modulations, and the second MCS table including the odd order modulation.

What is claimed is:

1. An apparatus for wireless communication, comprising:
a processor;
memory coupled with the processor; and
instructions stored in the memory and operable, when executed by the processor, to cause the apparatus to:
receive a configuration indicating network support for communications using odd order modulation;
transmit to a network entity, in response to the configuration, a request to change a current modulation and coding scheme (MCS) applied to communication between the apparatus and the network entity from a first MCS in a first MCS table to a second MCS in a second MCS table, the apparatus being a user equipment (UE), the first MCS table and the second MCS table respectively including a plurality of MCSs associated with MCS indices, each of the plurality of MCSs including a modulation order and a code rate, the first MCS table including even order modulations and lacking odd order modulations, and the second MCS table including the odd order modulations; and
transmit data in a signal using the second MCS, the second MCS including one of the odd order modulations.

2. The apparatus of claim 1, wherein the one of the odd order modulations is associated with a non-square quadrature amplitude modulation (QAM) constellation or a non-square amplitude and phase-shift keying (APSK) constellation.

3. The apparatus of claim 1, wherein the data is transmitted in a single-carrier frequency division multiple access (SC-FDMA) waveform, a Discrete Fourier transform-spread orthogonal frequency-division multiplexing (DFT-s-OFDM) waveform, or a Nyquist pulse shaped single carrier waveform.

4. The apparatus of claim 1, wherein the configuration is a radio resource control (RRC) configuration or a medium access control (MAC) control element (MAC-CE).

5. The apparatus of claim 1, wherein the request is transmitted in a physical uplink shared channel (PUSCH) or a physical uplink control channel (PUCCH).

6. The apparatus of claim 1, wherein the instructions, when executed by the processor, further cause the apparatus to transmit the request in response to a signal to noise ratio (SNR) of the configuration being at least equal to a phase noise SNR threshold.

7. The apparatus of claim 1, wherein the instructions, when executed by the processor, further cause the apparatus to transmit the request in response to a signal to noise ratio (SNR) of the configuration being at most equal to a cell edge SNR threshold.

8. The apparatus of claim 1, wherein the request is included in a channel state information (CSI) report.

9. The apparatus of claim 1, wherein the second MCS table further includes a portion of the even order modulations of the first MCS table.

10. The apparatus of claim 1, wherein the instructions, when executed by the processor, further cause the apparatus to:
receive a message inquiring whether the apparatus includes odd order modulation support; and
transmit, in response to the message, an acknowledgment indicating the odd order modulation support;
wherein the signal uses the one of the odd order modulations the odd order modulation based on the odd order modulation support.

11. The apparatus of claim 10, wherein the message is received in a physical downlink shared channel (PDSCH) or a physical downlink control channel (PDCCH).

12. The apparatus of claim 1, wherein the instructions, when executed by the processor, further cause the apparatus to:
transmit a channel state information (CSI) report indicating the one of the odd order modulations; and
receive, in response to the CSI report, downlink control information (DCI) scheduling transmission of the data in the signal using the one of the odd order modulations.

13. An apparatus for wireless communication, comprising:
a processor;
memory coupled with the processor; and
instructions stored in the memory and operable, when executed by the processor, to cause the apparatus to:
transmit a configuration indicating network support for communications using odd order modulation;
receive from a user equipment (UE), in response to the configuration, a request to change a current modulation and coding scheme (MCS) applied to communication between the apparatus and the UE from a first MCS in a first MCS table to a second MCS in a second MCS table, the apparatus being a network entity, the first MCS table and the second MCS table respectively including a plurality of MCSs associated with MCS indices, each of the plurality of MCSs including a modulation order and a code rate, the first MCS table including even order modulations and lacking odd order modulations, and the second MCS table including the odd order modulations; and
receive data in a signal using the second MCS, the second MCS including one of the odd order modulations.

14. The apparatus of claim 13, wherein the one of the odd order modulations is associated with a non-square quadrature amplitude modulation (QAM) constellation or a non-square amplitude and phase-shift keying (APSK) constellation.

15. The apparatus of claim 13, wherein the data is received in a single-carrier frequency division multiple access (SC-FDMA) waveform, a Discrete Fourier transform-spread orthogonal frequency-division multiplexing (DFT-s-OFDM) waveform, or a Nyquist pulse shaped single carrier waveform.

16. The apparatus of claim 13, wherein the configuration is a radio resource control (RRC) configuration or a medium access control (MAC) control element (MAC-CE).

17. The apparatus of claim 13, wherein the request is received in physical uplink shared channel (PUSCH) or a physical uplink control channel (PUCCH).

18. The apparatus of claim 13, wherein the instructions, when executed by the processor, further cause the apparatus to receive the request in response to a signal to noise ratio (SNR) of the configuration being at least equal to a phase noise SNR threshold.

19. The apparatus of claim 13, wherein the instructions, when executed by the processor, further cause the apparatus to receive the request in response to a signal to noise ratio (SNR) of the configuration being at most equal to a cell edge SNR threshold.

20. The apparatus of claim 13, wherein the request is included in a channel state information (CSI) report.

21. The apparatus of claim 13, wherein the second MCS table further includes a portion of the even order modulations of the first MCS table.

22. The apparatus of claim 13, wherein the instructions, when executed by the processor, further cause the apparatus to:
transmit a message inquiring whether the UE includes odd order modulation support; and
receive, in response to the message, an acknowledgment from the UE indicating the odd order modulation support;
wherein the signal uses the one of the odd order modulations based on the odd order modulation support.

23. The apparatus of claim 22, wherein the message is transmitted in a physical downlink shared channel (PDSCH) or a physical downlink control channel (PDCCH).

24. The apparatus of claim 13, wherein the instructions, when executed by the processor, further cause the apparatus to:
receive a channel state information (CSI) report indicating the one of the odd order modulations; and
transmit, in response to the CSI report, downlink control information (DCI) scheduling transmission of the data in the signal using the one of the odd order modulations.

25. A method of wireless communication at a user equipment (UE), comprising:
receiving a configuration indicating network support for communications using odd order modulation;
transmitting to a network entity, in response to the configuration, a request to change a current modulation and coding scheme (MCS) applied to communication between the UE and the network entity from a first MCS in a first MCS table to a second MCS in a second MCS table, the first MCS table and the second MCS table respectively including a plurality of MCSs associated with MCS indices, each of the plurality of MCSs including a modulation order and a code rate, the first MCS table including even order modulations and lacking odd order modulations, and the second MCS table including the odd order modulations; and
transmitting data in a signal using the second MCS, the second MCS including one of the odd order modulations.

26. The method of claim 25, wherein the second MCS table further includes a portion of the even order modulations of the first MCS table.

27. A method of wireless communication at a network entity, comprising:
transmitting a configuration indicating network support for communications using odd order modulation;
receiving from a user equipment (UE), in response to the configuration, a request to change a current modulation and coding scheme (MCS) applied to communication between the network entity and the UE from a first MCS in a first MCS table to a second MCS in a second MCS table, the first MCS table and the second MCS table respectively including a plurality of MCSs associated with MCS indices, each of the plurality of MCSs including a modulation order and a code rate, the first MCS table including even order modulations and lacking odd order modulations, and the second MCS table including the odd order modulations; and receiving data in a signal using the second MCS, the second MCS including one of the odd order modulations.

28. The method of claim 27, wherein the second MCS table further includes a portion of the even order modulations of the first MCS table.

\* \* \* \* \*